United States Patent
Jiang et al.

(10) Patent No.: US 11,606,583 B1
(45) Date of Patent: Mar. 14, 2023

(54) DISTRIBUTED DATA STORAGE FOR IN-VEHICLE ENTERTAINMENT SYSTEM

(71) Applicant: Panasonic Avionics Corporation, Irvine, CA (US)

(72) Inventors: Yichao Jiang, Irvine, CA (US); Andrew Barnes, Mission Viejo, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 0 days.

(21) Appl. No.: 17/805,994

(22) Filed: Jun. 8, 2022

(51) Int. Cl.
*H04N 21/232* (2011.01)
*H04N 21/214* (2011.01)
*H04N 21/414* (2011.01)

(52) U.S. Cl.
CPC ....... *H04N 21/232* (2013.01); *H04N 21/2146* (2013.01); *H04N 21/41422* (2013.01)

(58) Field of Classification Search
CPC ............ H04N 21/232; H04N 21/2146; H04N 21/41422
See application file for complete search history.

(56) References Cited

U.S. PATENT DOCUMENTS

| | | | | |
|---|---|---|---|---|
| 6,240,414 B1* | 5/2001 | Beizer | ................. | G06F 16/1787 |
| 6,249,913 B1* | 6/2001 | Galipeau | ............ | H04N 21/4143 |
| | | | | 348/E7.071 |
| 6,899,390 B2* | 5/2005 | Sanfrod | ............. | B64D 11/0624 |
| | | | | 297/217.4 |
| 7,814,515 B2* | 10/2010 | Ohyama | ................. | H04L 65/65 |
| | | | | 725/77 |
| 7,836,472 B2* | 11/2010 | Brady, Jr. | .......... | H04N 21/2146 |
| | | | | 725/74 |
| 7,984,190 B2* | 7/2011 | Rhoads | .................... | H04L 67/06 |
| | | | | 709/248 |
| 8,176,363 B2* | 5/2012 | Zlotnick | ............. | G06F 11/2082 |
| | | | | 714/13 |
| 8,649,161 B2* | 2/2014 | Kato | ................ | H04N 21/41422 |
| | | | | 345/905 |
| 8,782,637 B2* | 7/2014 | Khalid | ................ | G06F 9/45508 |
| | | | | 718/1 |
| 9,041,670 B2* | 5/2015 | Kobayashi | ....... | H04N 21/42208 |
| | | | | 345/173 |
| 9,083,581 B1* | 7/2015 | Addepalli | ............... | G06F 3/017 |

(Continued)

*Primary Examiner* — Michael B. Pierorazio
(74) *Attorney, Agent, or Firm* — Perkins Coie LLP

(57) ABSTRACT

A data storage system for providing entertainment content to terminal devices in a passenger vehicle is provided to comprise: a first group of terminal devices configured to operate as storage nodes of a storage cluster configured to provide the entertainment content to media playback devices disposed in the passenger vehicle, the entertainment content including one or more entertainment programs and the storage nodes configured to store blocks of the one or more entertainment programs; a second group of terminal devices configured to operate as monitor nodes in the storage cluster, the monitor nodes configured to monitor status of the storage nodes; and a host in communication with the first group and the second group of the terminal devices via an in-vehicle network and configured to store metadata for the storage cluster and facilitate delivery of the entertainment content from the first group of terminal devices to the media playback devices.

20 Claims, 17 Drawing Sheets

(56) References Cited

U.S. PATENT DOCUMENTS

| | | | | |
|---|---|---|---|---|
| 9,509,937 B2* | 11/2016 | Easterling | H04N 21/43615 |
| 9,961,373 B2* | 5/2018 | Margis | G06F 3/0482 |
| 10,097,603 B2* | 10/2018 | Watson | H04N 21/2146 |
| 10,256,646 B2* | 4/2019 | Suen | H02J 7/0013 |
| 10,348,832 B2* | 7/2019 | Bedekar | H04L 67/104 |
| 10,897,652 B1* | 1/2021 | Atkins | H04N 21/41422 |
| 11,102,519 B2* | 8/2021 | Barnes | H04N 21/2146 |
| 2006/0174285 A1* | 8/2006 | Brady | H04N 21/2146 725/78 |
| 2007/0106771 A1* | 5/2007 | Lucash | H04L 67/1095 709/223 |
| 2007/0250873 A1* | 10/2007 | Ohyama | H04N 21/2146 725/74 |
| 2008/0016081 A1* | 1/2008 | MacMillan | G06F 16/951 |
| 2008/0016196 A1* | 1/2008 | MacMillan | H04L 67/125 709/223 |
| 2012/0112694 A1* | 5/2012 | Frisch | B60L 53/11 320/109 |
| 2012/0233610 A1* | 9/2012 | Mandre | G06F 9/4856 718/1 |
| 2013/0093958 A1* | 4/2013 | Yoshikawa | H04N 21/41422 348/E5.057 |
| 2013/0144487 A1* | 6/2013 | Suzuki | G06F 17/00 701/36 |
| 2014/0059184 A1* | 2/2014 | Bird | H04L 65/60 709/219 |
| 2014/0074918 A1* | 3/2014 | Wang | G07F 17/3225 709/203 |
| 2014/0366125 A1* | 12/2014 | Murata | H04W 12/06 726/17 |
| 2015/0256580 A1* | 9/2015 | Morton | H04L 12/28 709/219 |
| 2015/0334441 A1* | 11/2015 | Sukegawa | H04N 21/436 725/25 |
| 2016/0055011 A1* | 2/2016 | Choi | G06F 9/45533 710/10 |
| 2016/0335108 A1* | 11/2016 | Ryu | G06F 9/45558 |
| 2016/0344792 A1* | 11/2016 | Sinivaara | H04N 21/25841 |
| 2019/0118950 A1* | 4/2019 | Pozzi | H05K 7/1412 |
| 2021/0240365 A1* | 8/2021 | Bates | H04L 9/12 |

* cited by examiner

DISTRIBUTED DATA STORAGE FOR IN-VEHICLE ENTERTAINMENT SYSTEM

TECHNICAL FIELD

This document is generally related to systems, methods, and apparatus to provide entertainment to passengers in commercial passenger vehicles such as airplanes, passenger trains, buses, cruise ships, and other forms of transportation.

BACKGROUND

Commercial travel has evolved with the increasing popularity of personal electronic devices (PEDs) that passengers carry on board, as well as media play devices provided in commercial passenger vehicles. Techniques that provide passengers in commercial passenger vehicles access to a large variety of entertainment content with minimal or no disruption will enhance a positive travel experience.

SUMMARY

This patent document describes, among other things, various implementations of a distributed entertainment data storage for an in-vehicle entertainment system.

In one aspect, a data storage system for providing entertainment content to terminal devices in a passenger vehicle is provided. The data storage system comprises: a first group of terminal devices associated with a first group of passenger seats in the passenger vehicle and configured to operate as storage nodes of a storage cluster configured to provide the entertainment content to media playback devices disposed in the passenger vehicle, the entertainment content including one or more entertainment programs and the storage nodes configured to store blocks of the one or more entertainment programs; a second group of terminal devices associated with a second group of passenger seats in the passenger vehicle and configured to operate as monitor nodes in the storage cluster, the monitor nodes configured to monitor status of the storage nodes; and a host in communication with the first group of the terminal devices and the second group of the terminal devices via an in-vehicle network and configured to store metadata for the storage cluster and facilitate delivery of the entertainment content from the first group of terminal devices to the media playback devices, and wherein the host is configured to (1) receive a first request for a particular entertainment program from a first passenger device and a second request for the particular entertainment program from a second passenger device and (2) direct the first request to a first terminal device operating as a first storage node storing a first block of the particular entertainment program and the second request to a second terminal device operating as a second storage node storing a second block of the particular entertainment program.

In another aspect, a method for providing a data storage system for passengers in a passenger vehicle is provided. The method comprises: configuring storage nodes of a storage cluster that is configured to provide entertainment content to media playback devices disposed in the passenger vehicle, the entertainment content including one or more entertainment programs and the storage nodes configured to store blocks of the one or more entertainment programs in a first group of terminal devices associated with a first group of passenger seats; configuring monitor nodes of the storage cluster to monitor status of the storage nodes and maintain a storage map of the storage cluster indicating mapping of the blocks of the one or more entertainment programs among the storage nodes, the monitor nodes corresponding to a second group of terminal devices associated with a second group of passenger seats in the passenger vehicle; and configuring a host in communication with the storage nodes and the monitor nodes via an in-vehicle network to store metadata for the storage cluster and facilitate delivery of the data from the first group of terminal devices to the media playback devices, and wherein the configuring of the host further includes: receiving a first request for a particular entertainment program from a first passenger device and a second request for the particular entertainment program from a second passenger device; and directing the first request to a first terminal device operating as a first storage node storing a first block of the particular entertainment program and the second request to a second terminal device operating as a second storage node storing a second block of the particular entertainment program.

In another aspect, a method for providing entertainment content from a data storage system to passengers in a passenger vehicle is provided. The method can be implemented by an in-vehicle entertainment system including the data storage system. The method comprises: maintaining a storage map indicating mapping of blocks of one or more entertainment programs stored in storage nodes that are associated with a first group of passenger seats in the passenger vehicle and configured to store the blocks of the one or more entertainment programs; receiving, from multiple passengers, requests for at least some of the blocks of the one or more entertainment programs, the request including a first request for a particular entertainment program from a first passenger device and a second request for the particular entertainment program from a second passenger device; in response to the receiving of the first request and the second request, direct, based on the storage map, the first request to a first storage node storing a first block of the particular entertainment program and the second request to a second storage node storing a second block of the particular entertainment program; in response to a detection of an overloading of the first block of the particular entertainment program by receiving a number of requests for the first block that is greater than a predetermined number, copying the first block from the first storage node to a third storage node; and in response to a detection of changes to the blocks stored in any one of the storage nodes, redistributing the blocks of the one or more entertainment programs stored in the storage nodes and updating the storage map based on the redistributing of the blocks.

In yet another exemplary embodiment, a device that is configured or operable to perform the above-described methods is disclosed.

The above and other aspects and their implementations are described in greater detail in the drawings, the description, and the claims.

DETAILED DESCRIPTION

Recent advances in digital video, computer and display technologies have made it possible to offer a large number of entertainment options to passengers traveling in a commercial vehicle. For example, international airlines often offer passengers tens or hundreds of movies, television shows, and audio programs produced across the globe. In addition, most travelers carry PEDs (personal electronic devices) having wireless communication capability, such as cellular phones, smart phones, tablet computers, laptop computers, and other portable electronic devices, and passengers have access to the entertainment options provided onboard through the PEDs.

With the increase in the entertainment options, the amount of entertainment data consumed during the trip also has increased significantly. Various implementations of the disclosed technology provide new data storage systems and methods. In one example aspect, the disclosed data storage schemes create an automated distributed file system in which more balanced load distribution is achieved without human intervention and can significantly improve availability and robustness of the storage for passengers in the passenger vehicle. With the disclosed data storage schemes, a greater audio/video streaming performance is possible, thereby improving passenger experience during the trip. Various implementations will be discussed in detail with reference to the figures below. In the description, an airplane is described as an example of the passenger vehicle, but the implementations of the disclosed technology can be applicable to other passenger vehicles such as buses, trains, ships, and other types of commercial passenger vehicles.

Figure 1:
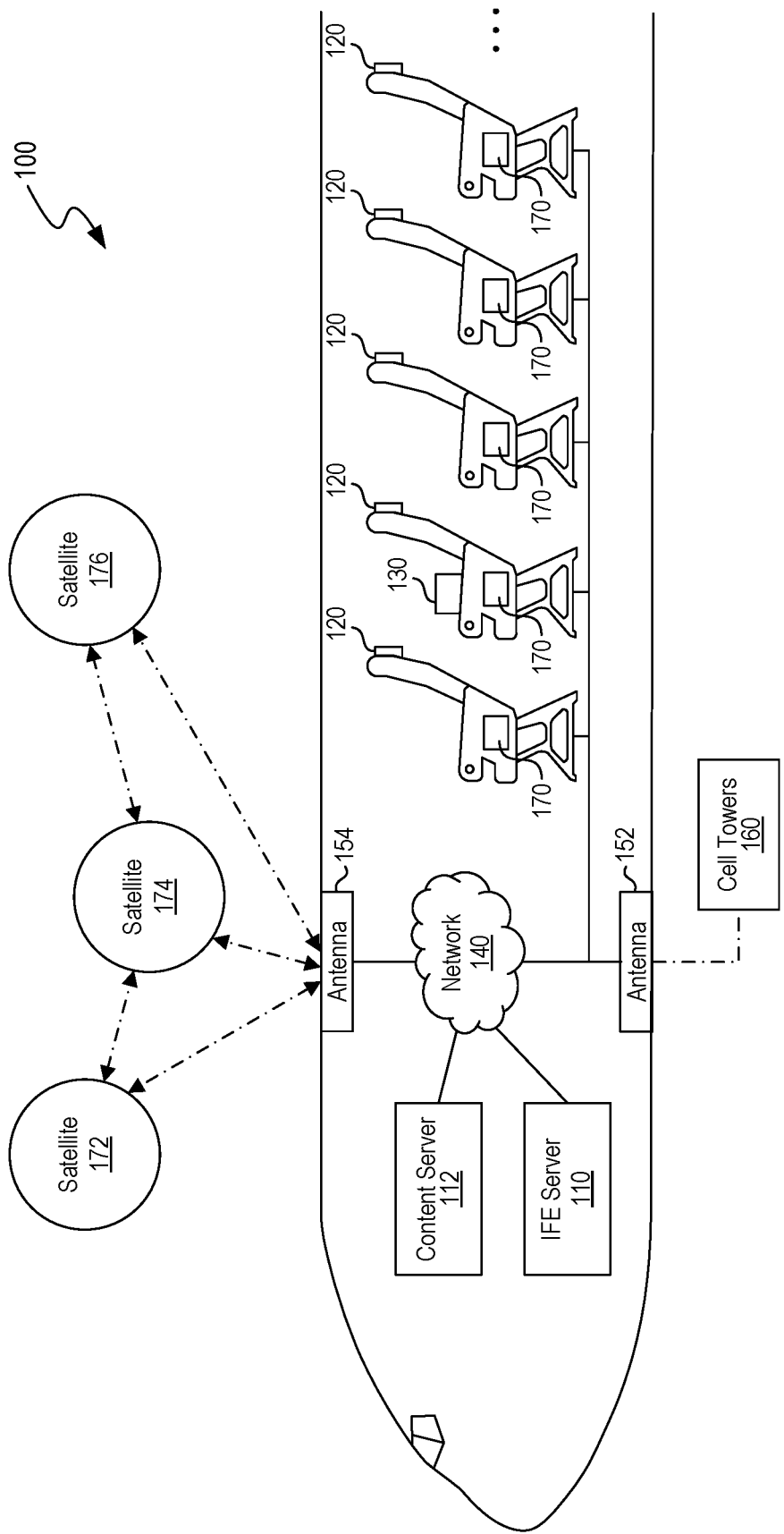
FIG. 1 shows an example of an in-flight entertainment (IFE) system provided in an airplane.

FIG. 1 shows an example of an in-flight entertainment (IFE) system installed in an airplane 100. The IFE system provides various entertainment and connectivity services to passengers on board. Referring to FIG. 1, the IFE system includes an IFE server 110, a content server 112, media playback devices 120, a PED (personal electronic device) 130, antenna 152, and antenna 154. In the example as shown in FIG. 1, the PEDs (personal electronic devices) 130 are carried by the travelers and configured with capabilities for data storage, video and audio streaming, internet communications, and others. The examples of PEDs 130 include smart phones, tablet computers, laptop computers, and other portable electronic devices. The media playback devices 120 are provided at each passenger seat and also configured with capabilities for data storage, video and audio streaming, internet communications, and other capabilities. Although FIG. 1 shows that the media playback devices 120 are mounted at the back of each passenger seat, other implementations are also possible. The IFE server 110 is communicably coupled with the media playback devices 120 and the PEDs 130 over the network 140 provided through the antenna 152 to and from ground-based cell tower 160 or through the antenna 154 to and from to and from the satellites 172, 174, 176 in an orbit, e.g., via a cellular network utilizing one or more onboard base station(s). The components of the IFE system, e.g., the IFE server 110, the content server 112, the media playback devices 120, the PEDs 130, and others, can be communicatively connected over the network 140, wherein the connection is achieved by, for example, a provision of network plugs at the seat for plugging PEDs 130 to a wired onboard local area network and/or via a cellular network utilizing one or more onboard base station(s), Wi-Fi utilizing the wireless access point, and/or Bluetooth.

The IFE system also includes terminal devices 170 installed for each seat. In the example of FIG. 1, the terminal devices 170 are mounted inside the passenger seats, but other implementations are also possible. The terminal devices 170 are configured to support providing entertainment options to the passengers on displays of the media playback devices 120 and/or the PEDs 130. The terminal devices 170 have storage areas configured to store data (e.g., media content). The terminal devices 170 may further include processing units configured to execute instructions to perform various processes and methods. In some implementations, the terminal devices 170 may decode the multimedia files corresponding to multimedia content and generates video and audio signals for the media playback devices 120 provided at each seat. The terminal devices 170 may be connected to the IFE server 110 and the content server 112 over the network 140 provided in the airplane 100. In some embodiments, the network 140 may comprise wired connections among the terminal devices 170 and the IFE server 110. For example, 100 Mbit of 1 Gb ethernet cables may be used to communicatively connect these various components of the IFE system. Different from a typical internet connection in a local area network or cloud-based computing resources, the data traffic occurring on the cabling of such IFE systems is almost entirely controlled by an on-board controller of the IFE system. In other words, the bandwidth may not be "opportunistic," as is the case in typical shared bandwidth internet deployments, but deterministic based on the physical capacity of the connecting cables and the amount of data traffic occurring under the control of the IFE server 110. Thus, in some embodiments, the network 140 may have a deterministic bandwidth in transmitting data to and from the components (e.g., the terminal devices 170) inside the airplane 100. The deterministic bandwidth may depend on the characteristics of the airplane 100 (for example, size, type, or other characteristics) and shared by the components inside the airplane. In some embodiments, the deterministic bandwidth available inside the airplane 100 may be substantially identical in the transmissions to and from the terminal devices 170 and the value of the deterministic bandwidth is already known before a trip. In some implementations, the bandwidth of the network available to the terminal devices 170 has a symmetric property because the bandwidth capacity of the "downstream" channel, or incoming data to a terminal device, is substantially identical to the bandwidth capacity of the "upstream" channel, or data outgoing from the terminal device. Similarly, all terminal devices 170 may have available bandwidth equal to one another because the same capacity cabling (e.g., gigabit ethernet) is used for wiring all in-flight devices. In some embodiments, each terminal device may have a deterministic or guaranteed bandwidth available, but the actual bandwidth or physical channel rate, sometimes called line rate, may be different for different devices in a vehicle. For example, first class and business class seats may be wired with higher capacity cabling than economy class seats.

The content server 112 is configured to store data and the IFE server 110 is configured to support the streaming/playback of the data based on requests from the passengers. Although FIG. 1 shows the content server 112 and the IFE server 110 as separate elements, those two servers can be combined into one. In some implementations, the data storage by the content server 112 is separate from the storage implemented with the terminal devices 170. In some other implementations, the data storage by the content server 112 can be a part of the cluster pool created by the data storage implemented with the terminal devices 170. In some implementations, the content server 112 is the optional element and can be omitted. Each server in the airplane 100 can be implemented as a standalone computer system with one or more general purpose data processors, memory, secondary storage, and a network interface device for connecting to the local area network. The computer systems may have an operating system installed thereon, along with server applications (e.g., web servers, streaming servers, and so forth) providing various in-flight entertainment/communications services in cooperation with other devices connected thereto. Although not shown in FIG. 1, the IFE system may further include a database which stores passenger information, for example, profiles of the passengers (name, age, etc.), preferred entertainment options (movies, music, shows, etc.), preferred entertainment content (e.g., genres of movies), etc. The passenger information can be obtained in multiple manners and is stored in the database of the IFE system. In some implementations, the passenger information is obtained prior to the passengers coming on board, e.g., at the time of purchasing the tickets or checking in for the flights, or at other times. In some implementations, the passenger information can be obtained and shared by an association of several airplane companies and retrieved from an external database. In some implementations, as discussed later in this patent document, the passenger information can be updated during the trip based on the data about viewing history during the trip.

Figure 2:
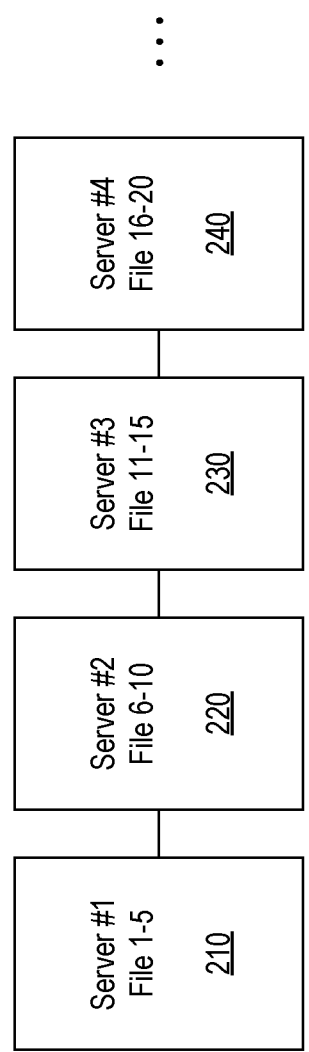
FIG. 2 shows an example diagram illustrating a conventional data distribution scheme for an IFE system.

FIG. 2 shows an example diagram illustrating a conventional data distribution scheme for an IFE system. The conventional IFE system needs a head end server to stream media content to seats in a passenger vehicle, which adds cost and complexity to a system installation, or the IFE system relies on a system based on virtualized local storage (VLS). Current manifestations of VLS are file-based (for example, FAT32) at each node, which nodes are still managed centrally by a head end processor or network management device. These nodes, which are all of the same size/storage density, store movies. Referring to FIG. 2, the first server 210, the second server 220, the third server 230, and the fourth server 240 have the same storage size such that the first server 210 stores files 1-5, the second server 220 stores files 6-10, the third server 230 stores files 11-15, and the fourth server 240 stores files 16-20. The storage map is created off-line, and movies are distributed in the file system at software load time. The storage of the movies are static, which requires a new installation of media for re-balancing or replication. The conventional file-based data distribution scheme has disadvantages in terms of efficiency, speed, etc., which will be further discussed later in this patent document.

Figure 3:
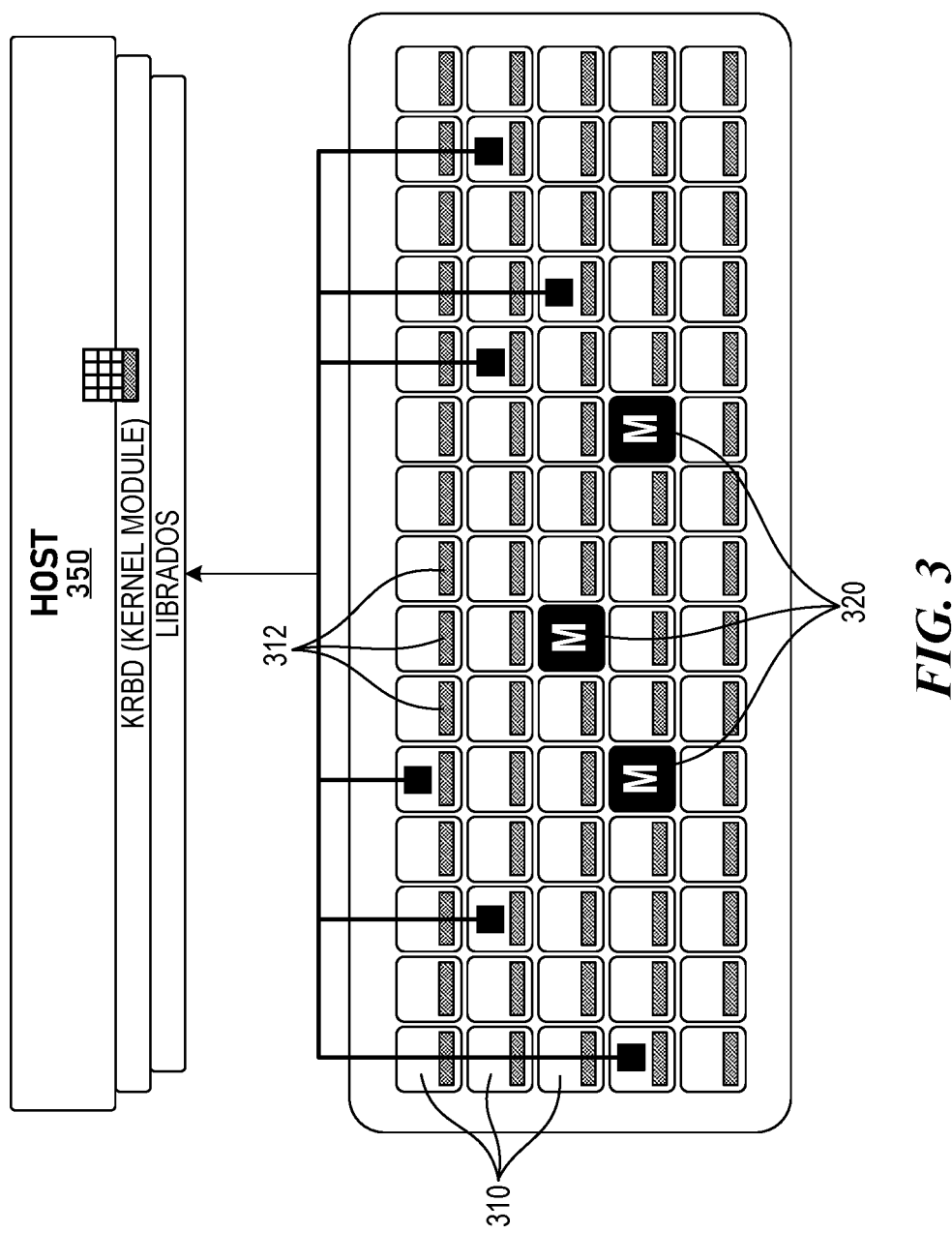
FIG. 3 shows an example diagram illustrating a data storage system for providing entertainment content to passengers in a passenger vehicle based on some implementations of the disclosed technology.

FIG. 3 shows an example diagram illustrating a data storage system for providing entertainment content to passengers in a passenger vehicle based on some implementations of the disclosed technology. The suggested implementations of the data storage system take the concept of a distributed file system such as Ceph or GlusterFS. In this patent document, Ceph is mentioned as the example, but other distributed storage can be implemented as applicable. The Ceph system is known to be live in Linux virtual machine (VM) and allow the direct access to the storage device and block level storage. In the example, the minimum hardware requirement for the Ceph system is 1 core and 2 GB memory. The suggested data storage system creates the storage cluster as shown in FIG. 3 and decentralize the management of the media content and layered-in features that improve the performance and the reliability within a captive aircraft environment.

Figure 4:
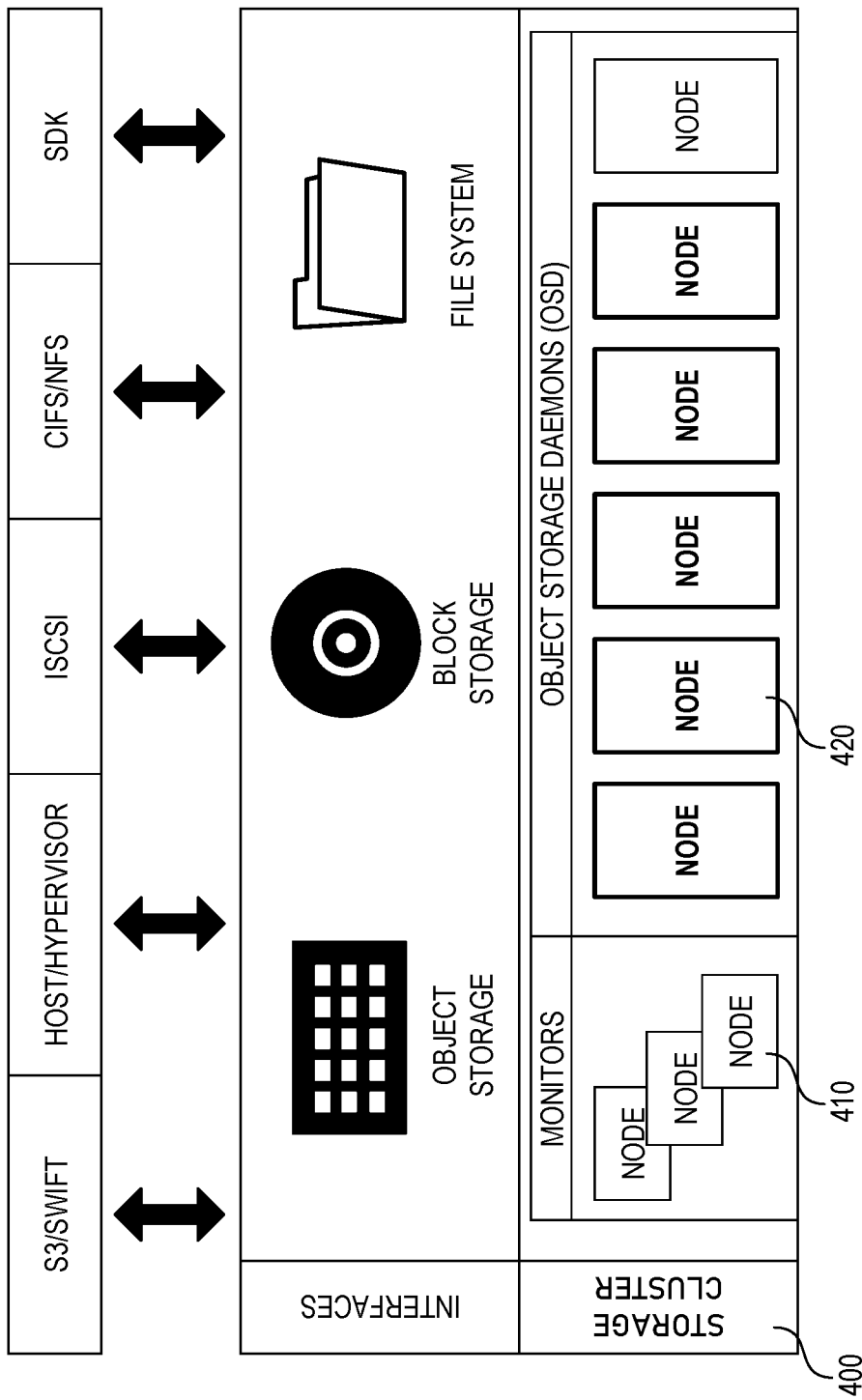
FIG. 4 shows an example diagram illustrating a Ceph storage system.

FIG. 4 shows an example diagram illustrating a Ceph storage system. The example as shown in FIG. 4 illustrates the storage cluster 400 which is applied to the IFE system provided according to various implementations of the disclosed technology. Referring to FIG. 4, the storage cluster 400 includes multiple monitor daemons 410 and the storage nodes 420. The monitor nodes constantly run in the background to supervise status of the individual storage nodes 420, which will automatically (or under quasi-manual control) rebalance or even heal failed nodes. Authentication services (using shared secret keys) may be also included for security. As shown in FIG. 4, the storage cluster 400 receives data from various clients whether it comes through an object storage (e.g., S3/SWIFT), a block storage (ISCSI), or a file storage (CIFS/NFS). The suggested distributed data storage solutions break down the movies or other content into smaller blocks (rather than the whole file) which are distributed more granularly across the cluster of nodes, and provide a much higher degree of scalability with better network load balancing. Furthermore, multiple nodes can have different storage sizes and cluster group sizes. No head end server is required for managing the network.

Referring back to FIG. 3, the data storage system as shown in FIG. 3 includes an object storage daemon (OSD) node 310 which corresponds to an individual storage node having a storage area 312 configured to store data, and a monitor node 320 which checks a status of the OSD node 310 and maintains a storage map of the individual OSD nodes 310. The OSD nodes 310 and the monitor nodes 320 together create the storage cluster. The OSD nodes 310 may be also referred to as the storage nodes. In the implementations, the OSD nodes 310 can have different sizes from each other. For example, the different sections of the airplane can have OSD nodes of different sizes. In the example, the OSD nodes associated with the business class seats may have a greater size that the OSD nodes associated with the economy class seats. In some implementations, different line replaceable units (LRUs) can have different storage sizes even in the same section. As discussed below, the data management algorithm applied to the data storage system can take the storage sizes of the individual OSD nodes into consideration when distributing the data. The monitor nodes 320 are spread out in the cabin and the monitor nodes 320 have a voting mechanism for checking the OSD nodes 310. Thus, when there are conflicting monitoring results for a certain storage node, the integrity of the certain storage node can be determined based on the majority vote of the monitoring nodes 320. The data storage system further includes a host 350 which becomes the point of contact for data access. The host 350 may operate as a metadata server in the data file system including the storage cluster, e.g., the Ceph storage cluster. In some implementations, the host 350 may further operate as a streaming server as well as the metadata server of the data file system. In the example, the host 350 of FIG. 3 corresponds to the IFE server 110 as shown in FIG. 1 or the content server 112 or any unit having the capability operable as the metadata server.

In the implementations of the disclosed technology, most seat boxes operate as the OSD nodes 310, each OSD node 310 having a storage 412, and a limited number of seat boxes operate as the monitor nodes 320. The seat boxes may correspond to the terminal devices 170 as shown in FIG. 1. In some implementations, the storage area 412 of each OSD node 310 may correspond to at least a portion of a storage area of the terminal devices 170 as shown in FIG. 1. In some implementations, the monitor nodes 320 may correspond to the processors of the terminal devices 170 as shown in FIG. 1. In some other implementations, the storage area 412 can be configured separately from the terminal device 170 as long as it has the capacity to store data and be communicable with the IFE system. In some implementations, the terminal devices 170 can correspond to one or two OSD nodes 310. The number of OSD nodes 310 in the storage cluster may be a function of the amount of data to be stored, the size of each storage area in an OSD node, and the level and type of redundancy specified (replication or erasure coding), etc. The monitor nodes 320 are configured to manage critical cluster states, which includes cluster membership and authentication information.

In the data storage system according to various implementations of the disclosed technology, the client (e.g., media playback devices and/or PEDs) can communicate with the host 350 operating as the metadata server to fetch the storage map to different nodes. The client access to the OSD nodes 310 proceeds in parallel based on the storage map. The monitor node 320 operates to maintain the integrity of the cluster pool and the storage map of the storage cluster. The storage cluster clients retrieve a copy of the storage map from the monitor node 320. Each OSD node 310 checks its own state and the state of another OSD node and reports back to the monitor node 320. When a failed node is detected by the monitor node 320, the monitor node 320 automatically relocates the content of the failed node to the remaining nodes.

In various implementations of the disclosed technology, the data management algorithm is applied to the storage cluster to distribute data objects among storage devices according to a per-device weight value, approximating a uniform probability distribution. Since a total storage capacity available for storing data is already fixed for the airplane, determining how to distribute data inside available storage areas in the airplane is important to improve the performance of the data storage system. The data management algorithm distributes the data among the OSD nodes based on the symmetric bandwidth property and/or guaranteed bandwidth property of the network in transmissions to and from the OSD nodes 310. In this patent document, the CRUSH algorithm is described as the example of the data management algorithm but other algorithms can be applied as applicable. The storage capacity of the storage device of each seat box is automatically weighed by a corresponding algorithm (e.g., CRUSH algorithm), and an OSD node with more capacity automatically receives more data (e.g., blocks). Thus, the data management algorithm distributes the data among the OSD nodes in consideration of the size of the individual OSD nodes. In addition, the data management algorithm is applied to efficiently compute information about object location without having to depend on a central lookup table, thereby providing a better data management mechanism compared to older approaches, and enabling massive scale by distributing the work to all the clients and the OSD nodes in the storage cluster. In the example, the data management algorithm uses intelligent data replication to ensure resiliency, which is better suited to hyper-scale storage. With the implementation of the data storage system, the file is divided into blocks and spread among the OSD nodes, which enables parallel access and parallel duplication/healing, and the automatic distribution and the automatic healing are allowed. The block-based streaming feature will be further discussed later in this patent document with reference to FIGS. 7A to 11.

Figure 5:
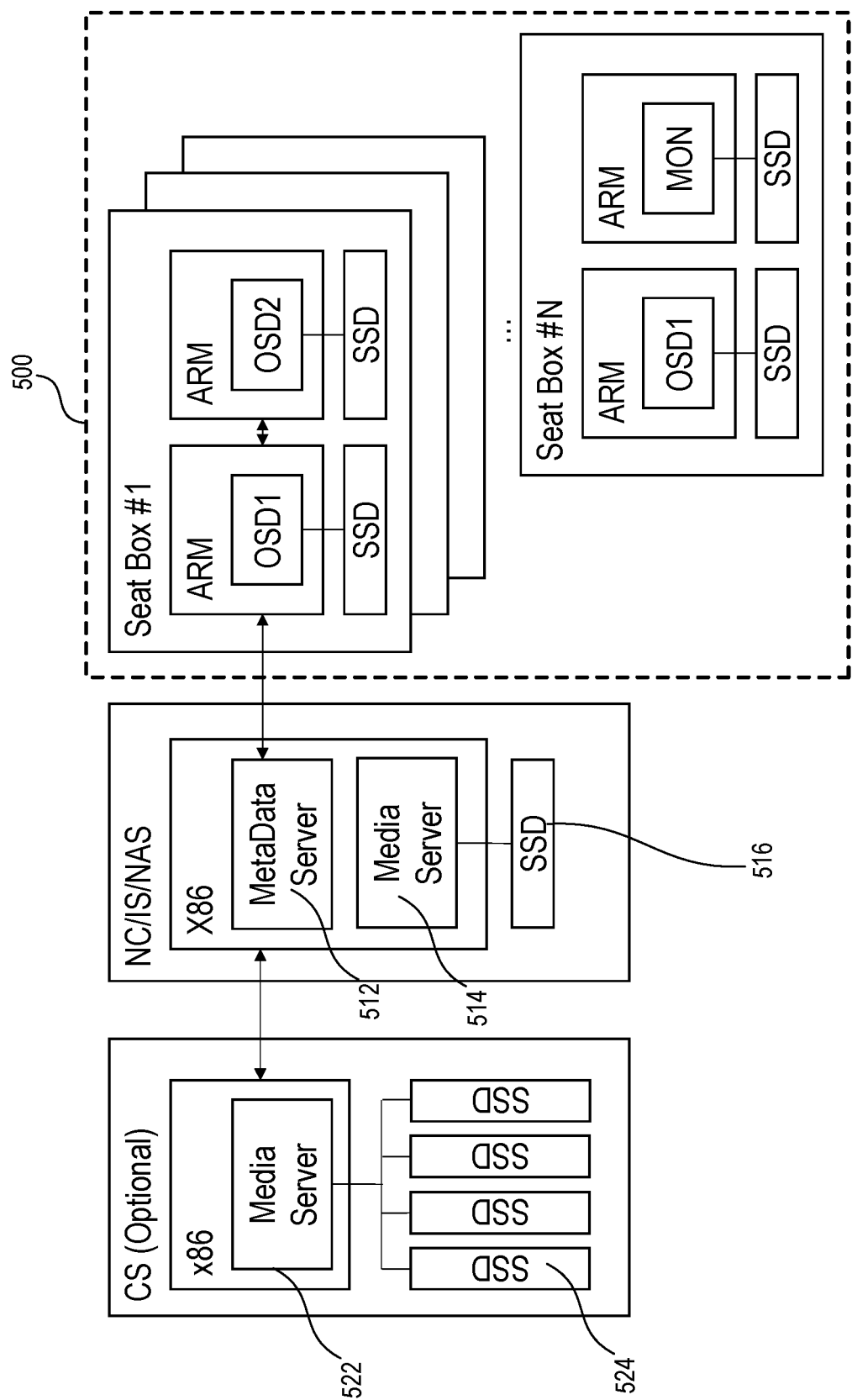
FIG. 5 shows an example of a data storage system implemented to a cabin file system forming a storage cluster using seat boxes disposed in passenger seats based on some implementations of the disclosed technology.

FIG. 5 shows an example of a data storage system implemented to a cabin file system forming a storage cluster using seat boxes disposed in passenger seats based on some implementations of the disclosed technology. In the example of FIG. 5, the cabin file system 500 is implemented with seat boxes #1 to #n that form the cabin pool which includes multiple OSD nodes and a limited number of monitor nodes. In the example, the number of monitor nodes and their distribution can be determined depending on the specific airplanes. In FIG. 5, although each seat box is shown as including two OSD nodes having corresponding storages, the number of OSDs assigned to each seat box may be different in other implementations. For example, a single OSD node may be assigned to a seat box and other implementations are also possible.

In some implementations, the cabin file system 500 is independent of the content server (CS) and the content server (CS) can be omitted. The cabin file system 500 and the content server (CS) 520 act as backup for each other while hosting the same library. The content server (CS) 520 has a component (e.g., X86) that can be virtualized and includes media server 522, which is coupled to four solid state drives (SSDs) 524. The media server 522 of the content server (CS) may be independent of the cabin file system 500 and both pools formed by the cabin file system 500 and the content server (CS) operate as backup for each other. The data server (e.g., NC (National Center), IS (Information System), NAS (National Airspace System) or others) includes a component (e.g., X86) that can be virtualized and include a metadata server 512 and media server 514 coupled to a SSD 516. The SSD is shown as an example of the storage device only, and other implementations are also possible. In addition, the X86 is an example only, and the component can be implemented as a CPU, a processor, or other logic units. With the virtualization of the component, it is possible to have multiple components for backup.

Figure 6:
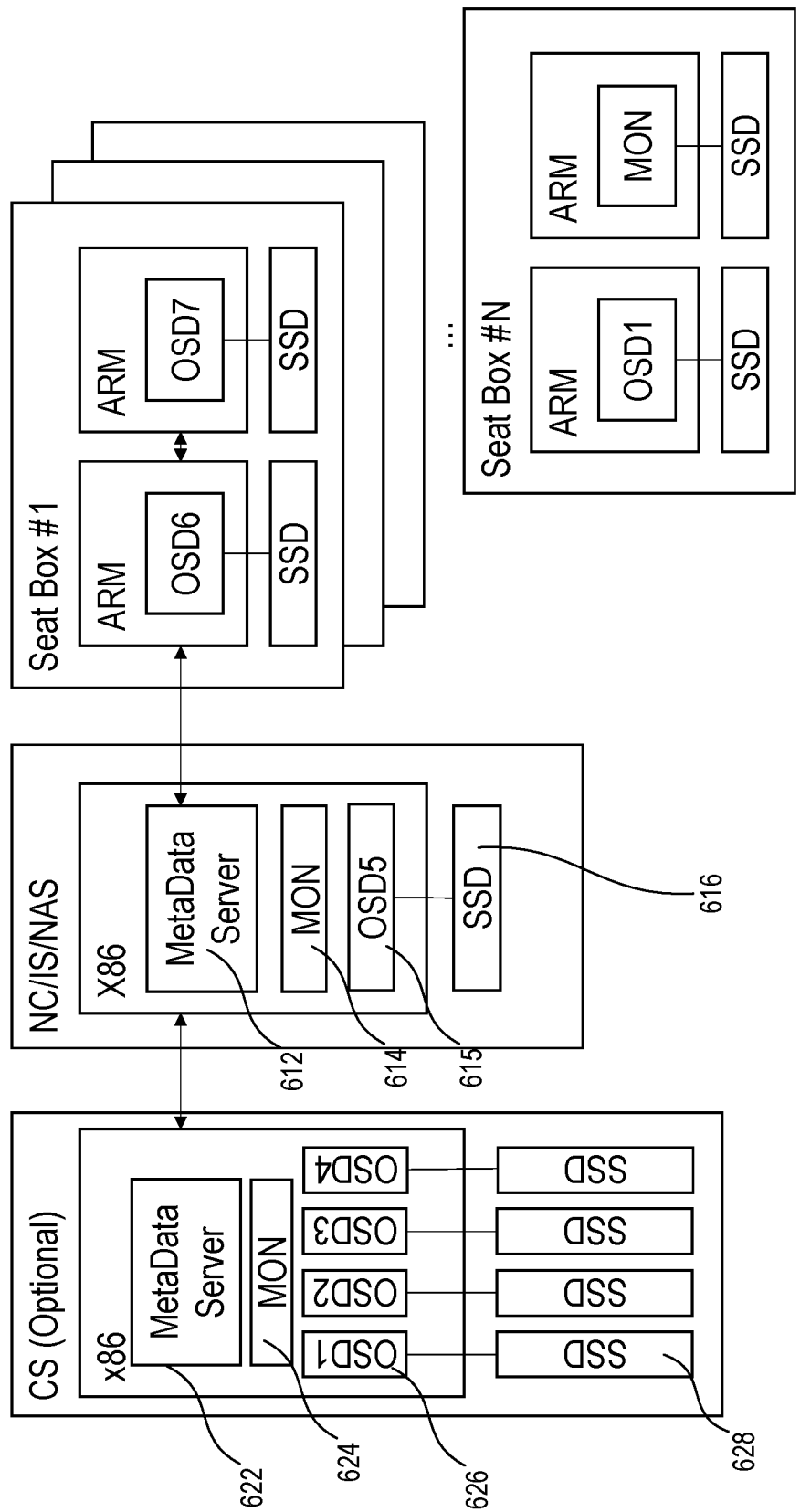
FIG. 6 shows an example of a data storage system implemented to all line replaceable units (LRUs) including seat boxes disposed in a passenger vehicle.

FIG. 6 shows an example of a data storage system implemented to all line replaceable units (LRUs) including seat boxes disposed in a passenger vehicle. In FIG. 6, the content server (CS) can be a part of the cluster pool as the content server (CS) is a multi-core processor that can serve multiple OSD nodes (e.g., OSD1 626 to OSD4) having corresponding storages (e.g., SSD 628) and monitor nodes 624. The content server (CS) can participate in the data distributing and monitoring, effectively combining the storage capacity of the content server (CS) with the cabin pool into one giant pool. The data server (e.g., NC (National Center), IS (Information System), NAS (National Airspace System) or others) includes a component (e.g., X86) that can be virtualized. The data server can also be a part of the cluster pool by including a metadata server 612, a monitor node 614, and an OSD node 615 having a corresponding storage 616. In the aircraft, storage hardware is valuable and small in quantity, and thus increasing the pool by combining the storage capacity of the content server (CS) can improve the performance of the data storage and distribution. As the data storage system can provide redundancy by itself using the multiple copy pool, it is better to have the content server (CS) participate in the pool instead of providing a third independent copy of the library. In the example as shown in FIG. 6, the seat box group including seat boxes and the head end can form a data pool together and the auto-balancing can be obtained between the head end and the seat box group. The unified cabin storage network can be achieved with maximum storage density. The seat box group and head end dynamically create on-demand redundancy for each other within the cluster pool using software/applications.

Figure 7A:
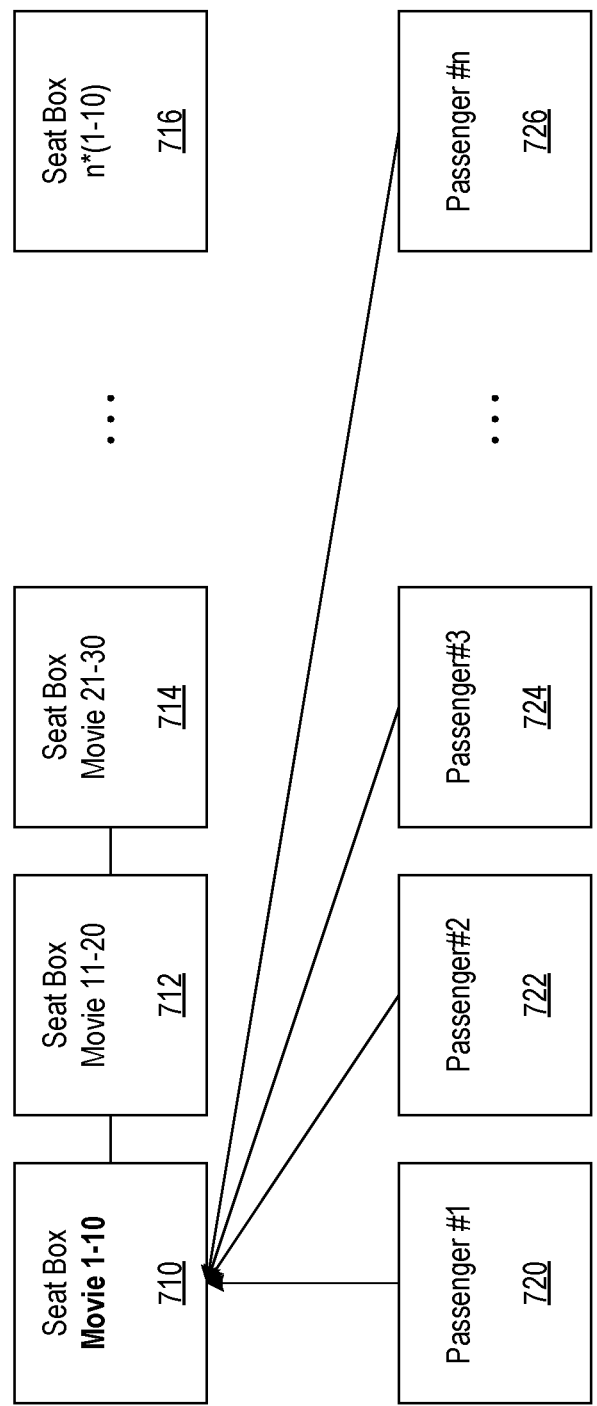
FIG. 7A shows a comparison example of a conventional file-based streaming service and FIG. 7B shows an example of a block-based streaming service provided using a data storage system based on some implementations of the disclosed technology.
Figure 7B:
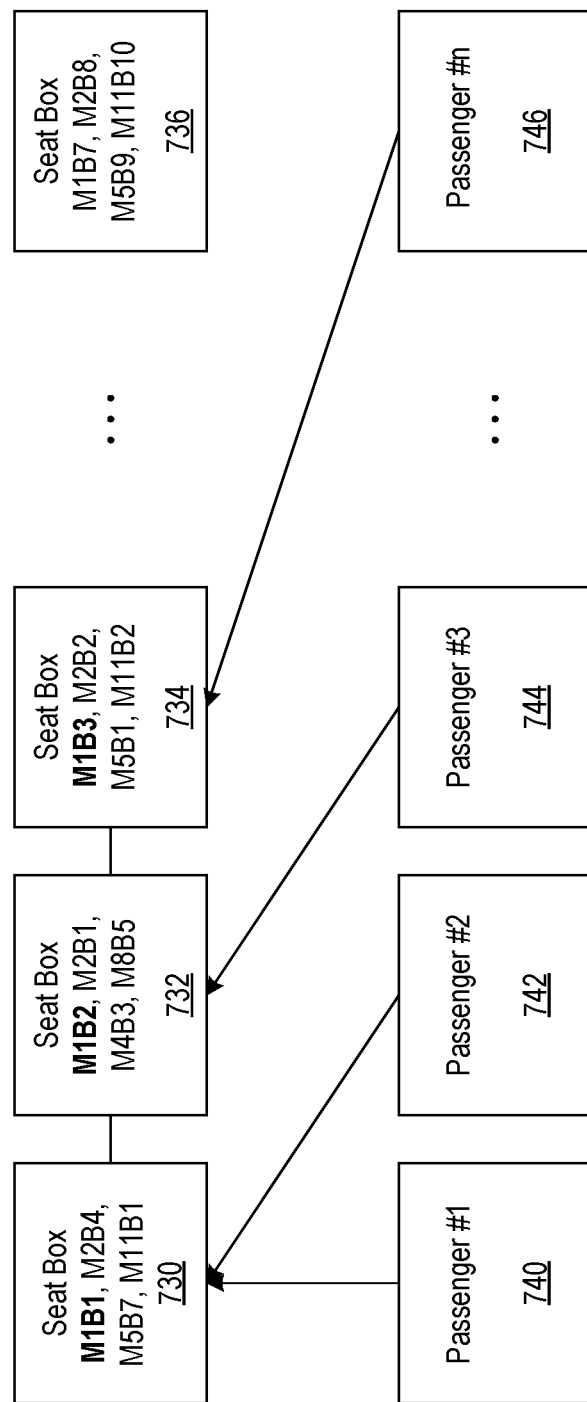

FIG. 7A shows a comparison example of a conventional file-based streaming service and FIG. 7B shows an example of a block-based streaming service provided using a data storage system based on some implementations of the disclosed technology. The seat boxes as described below may correspond to the seat boxes as shown in FIGS. 5 and 6.

Referring to FIG. 7A, data (for example, files of movies) is stored in each seat box such that the first seat box 710 stores files of Movies 1-10, the second seat box 712 stores files of Movies 11-20, the third seat box 714 stores files of Movies 21-30, and so on. Movies 1-30 are different movies from one another. A file of a movie corresponds to the playback of the whole movie, when played by the media playback devices and/or PEDs. Assume that the IFE system receives, from many passengers, multiple requests for Movie 1 through media playback devices and/or PEDs and Movie 1 becomes very popular. Since Movie 1 is stored in the first seat box 710, all requests for the file of Movie 1 from passengers #1 to #N are addressed to the first seat box 710. In this case, the great amount of load is created at the first seat box 710, which makes the load for the data distribution unbalanced and causes a network congestion. Thus, when there are many passengers all attempting to watch Movie 1, the traffic can slow down the performance for delivering the files to the passengers, which can negatively impact the passenger experiences.

In the implementations of the data storage system according to the disclosed technology, the file of a movie is chopped into multiple blocks and seat boxes are configured to store blocks of movies instead of the whole file. In the example of FIG. 7B, the first seat box 730 stores the block M1B1 of Movie 1, the block M2B4 of Movie 2, the block M5B7 of Movie 3, and the block M11B1 of Movie 4, the second seat box 732 stores the block M1B2 of Movie 1, the block M2B1 of Movie 2, the block M4B3 of Movie 3, and the block M8B5 of Movie 4, the third seat box 734 stores the block M1B3 of Movie 1, the block M2B2 of Movie 2, the block M5B1 of Movie 3, and the block M11B2 of Movie 4, and the Nth seat box 736 stores the block M1B7 of Movie 1, the block M2B8 of Movie 2, the block M5B9 of Movie 3, and the block M11B10 of Movie 4. In the implementation, the multiple blocks are associated with the same movie, each block corresponding to the playback of a corresponding time interval. For example, the block M1B1 of Movie 1 corresponds to the playback of Movie 1 from 0:00 to 4:59, the block M1B2 corresponds to the playback of Movie 1 from 5:00 to 9:59, the block M1B3 corresponds to the playback of Movie 1 from 10:00 to 14:59, and so on. The size of the block can be determined based on the playback time, and in the above example, each block corresponds to a playback time of 4 minutes 59 seconds as an example only. The blocks of the movies are distributed using the data management algorithm (such as CRUSH algorithm) applied to the data storage system forming the storage cluster. In the example of FIG. 7B, each seat box includes blocks of different movies.

Referring to FIG. 7B, even if assuming that Movie 1 becomes very popular by receiving many requests from the passengers, the requests from the passengers can be more spread out instead of being focused on the specific seat box since there are multiple seat boxes storing different blocks of Movie 1. In the example of FIG. 7B, although passengers #1 to #n all request to play Movie 1, the requests are addressed to different seat boxes based on which blocks of Movie 1 are requested from the corresponding passengers. Since the data is stored in the seat boxes in the unit of blocks instead of the whole file of Movie 1, the requests for Movie 1 can be more spread out. In FIG. 7B, the requests from passenger #1 and passenger #2 for the playback of block M1B1 of Movie 1 are addressed to the first seat box 730 storing the block M1B1, the request from passenger #3 for the playback of block M1B2 of Movie 1 are addressed to the second seat box 732 storing the block M1B2, and the request from passenger #n for the playback of block M1B3 of Movie 1 are addressed to the third seat box 734 storing the block M1B3. Thus, even when there is a very popular movie that most passengers want to watch, it is possible to achieve more balanced load among the seat boxes by distributing, based on the specific blocks requested by the passengers, the data exchanges between the seat boxes and the passengers. In the implementations of the disclosed technology, the data storage system to which the Ceph is applied can direct the requests from passengers to the corresponding seat boxes such that the desired blocks of the movie can be delivered from the corresponding seat boxes to the passengers. Accordingly, more balanced load in distributing data can be achieved, which can improve the passenger experiences without causing any delay in playing media content during the trip.

Figure 8A:
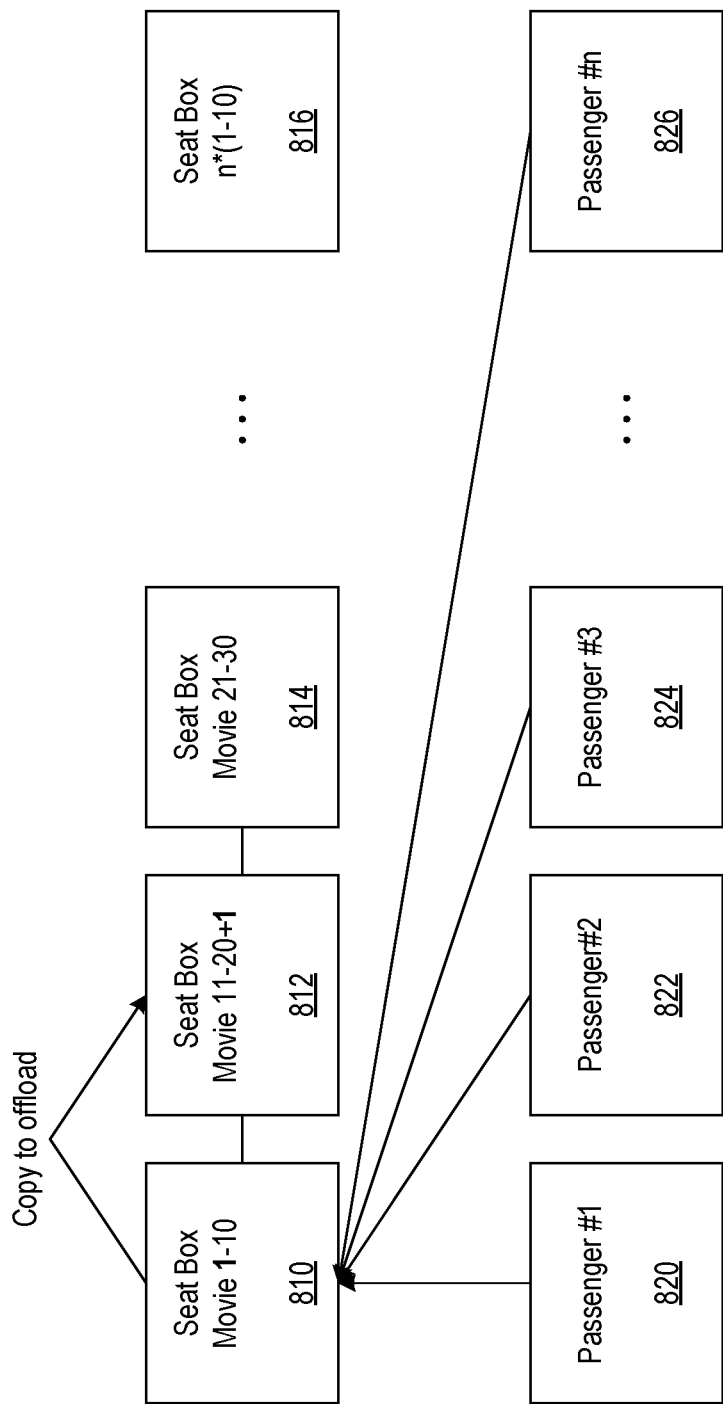
FIG. 8A shows a comparison example of a conventional data offloading operation and FIG. 8B shows an example of a data offloading operation using a data storage system based on some implementations of the disclosed technology.
Figure 8B:
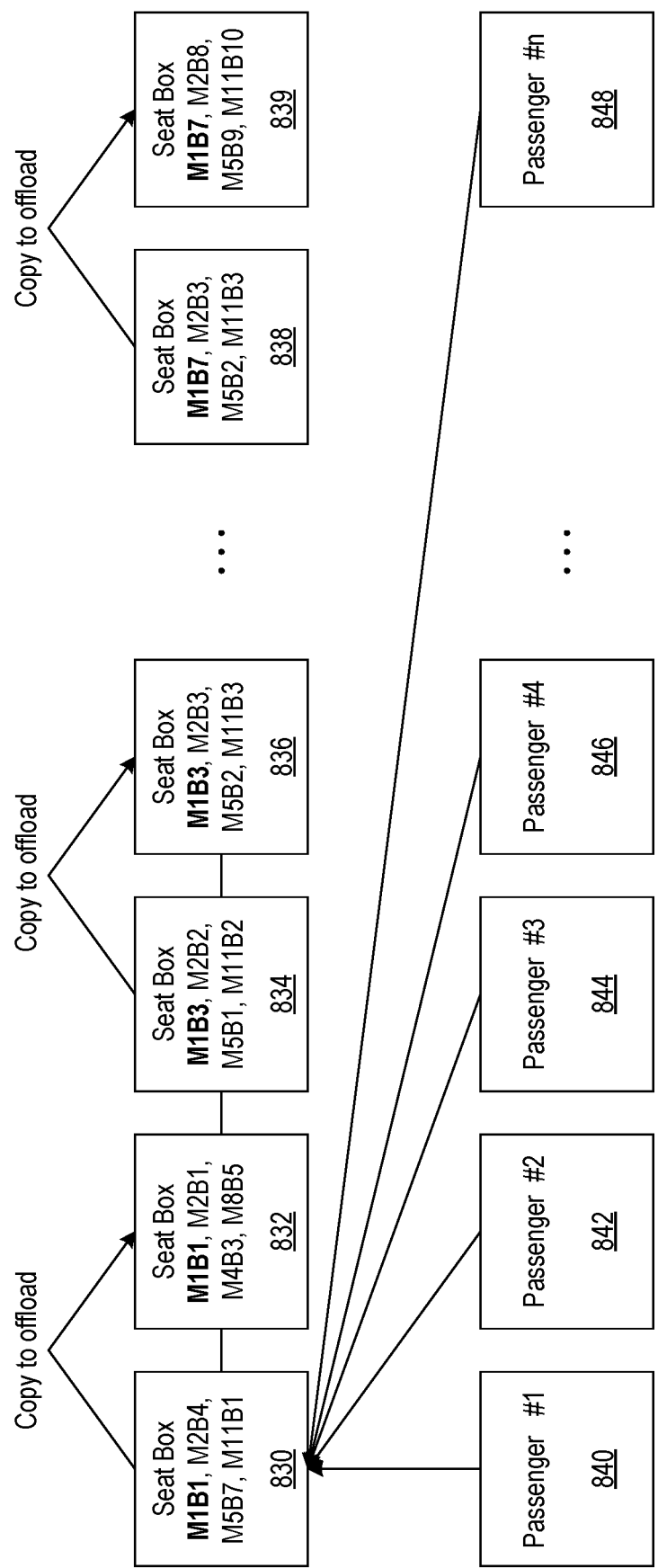

FIG. 8A shows a comparison example of a conventional data offloading operation and FIG. 8B shows an example of a data offloading operation using a data storage system based on some implementations of the disclosed technology. The operations as shown in FIGS. 8A and 8B are related to an over-subscription scenario wherein there are a substantially large number of requests for certain data from multiple passengers at the same time. When the over-subscription occurs, the corresponding data is copied from one seat box to another seat box, which may be referred to as the offloading of the data.

The over-subscription scenario as shown in FIG. 8A is the same as that shown in FIG. 7A. The first seat box 810 stores Movies 1-10, the second seat box 812 stores Movies 11-20, the third seat box 814 stores Movies 21-30, and so on, and all requests for the file of Movie 1 from passenger #1 820 to passenger #n 826 are addressed to the first seat box 810. In this case, the conventional data offloading operation is performed such that the file of Movie 1 is copied from the first seat box 810 to another seat box 812. In the conventional scenario, however, this data offloading causes more burden to the first seat box 810 since the first seat box 810 needs to additionally perform the data offloading in addition to dealing with the requests from passengers #1 to #n. In addition, since the amount of the data to be copied is as much as the size of the file, and since each seat box has a very limited capability for data offloading, the data offloading takes a relatively long time. Thus, the conventional data offloading overloads the first seat box even more and makes streaming less reliable, and lowers the throughput, which negatively impacts the passenger experience.

In the implementations of the data storage system according to the disclosed technology, the data offloading can proceed much more quicker since what is copied during the data offloading operation by a seat box is the block instead of the whole file. For example, as shown in FIG. 8B, all of passenger #1 840 to passenger #n 848 requests for the block M1B1 of the file of Movie 1 are addressed to the first seat box 830, and the block M1B1 is copied from the first seat box 830 to another seat box 832. Since what is copied during the data offloading by the first seat box 830 is the block M1B1 only instead of the whole file of Movie 1, the load to the first seat box 830 is much less as compared to copying the whole file of Movie 1 from the first seat box 830 to another seat box.

In some implementations, the data storage system may detect the overloading of the block M1B1 of the file of Movie 1 and send the notification to the corresponding seat box 830 storing the block M1B1 such that the block M1B1 is to be copied to another seat box. In some implementations, the overloading of the data can be detected by an algorithm that compares the requests from a passenger for a certain data with a predetermined number. In the example, when the block M1B1 has data corresponding to the playback for five minutes, the host may detect the overloading of the block M1B1 within one minute from the start of the playback of the block, and then allow another seat box to start the data offloading immediately. Such data offloading to another seat box may be completed within another one or two minutes before the finish of the playback of the block. Once the data is offloaded to another seat box, the blocks are redistributed among the seat boxes using the data management algorithm and the storage map is updated and then provided to the host of the data storage system. The host of the data storage system may direct the requests from the passengers based on the updated storage map. For example, the host may direct passengers who request the block M1B1 after the data offloading to the another seat box to which the block M1B1 is copied. In some implementations, the host may push some of the previously accessed passengers who have already accessed to the seat box 830 for the block M1B1 to another seat box to which the block M1B1 is copied. In this case, depending on the time when the data offloading starts and the time taken for the data offloading, a part of the playback of the block M1B1 can be done through the another seat box. For example, when the passenger is pushed from the seat box 830 to another seat box after the data offloading, the pushed passengers can play at least two or three minutes of the block M1B1 through the another seat box. The timing of the decision of the host to start the offloading operation and managing of the offloading time can be implemented in various manners. Various algorithms can be applied to the host to achieve an efficient offloading process. In the example, when the data storage system is implemented to create the storage cluster, the load is automatically balanced and thus the host can locate the request from the client accordingly without figuring out the optimum destination. In the example, the data management algorithm can automatically redirect the request from the client. In the description above, while the host is described as managing operations that include the detecting of the overloading, sending notification(s), etc., such operations can be performed in other units in the IFE system.

In some implementations, the data management system may be further configured to send the notification to other seat boxes than those storing the block being overloaded to notify the overloading of the block. In this case, in response to the notifications, other seat boxes storing other blocks of the same movie as the block being overloaded can also perform the data offloading of the corresponding blocks. In the example of FIG. 8B, when passenger #1 to passenger #n all request for the block M1B1 of Movie 1, the seat box 834 and the seat box 838 also proceed with data offloading of the different blocks of Movie 1 such that the block M1B3 of Movie 1 is copied from the seat box 834 to the seat box 836 and the block M1B7 of Movie 1 is copied from the seat box 838 to the seat box 839. Such data offloading operations of different blocks of the file of a certain movie (e.g., Movie 1 as shown in FIG. 8B) proceed in parallel, which makes the data offloading process for the same movie much quicker and more efficient and provides less visibility of performance fluctuation from the user's point of view. In some implementations, various algorithms can be employed to determine for which blocks data offloading proceeds in the case of the over-subscribing. For example, when a certain block of a movie is over-subscribed, all other blocks of the movie can be copied to other seat boxes. In another example, when a certain block of a movie is over-subscribed, a predetermined number of blocks of the movie, e.g., N blocks prior to the over-subscribed block and N blocks subsequent to the over-subscribed block, can be copied to other seat boxes.

Figure 9A:
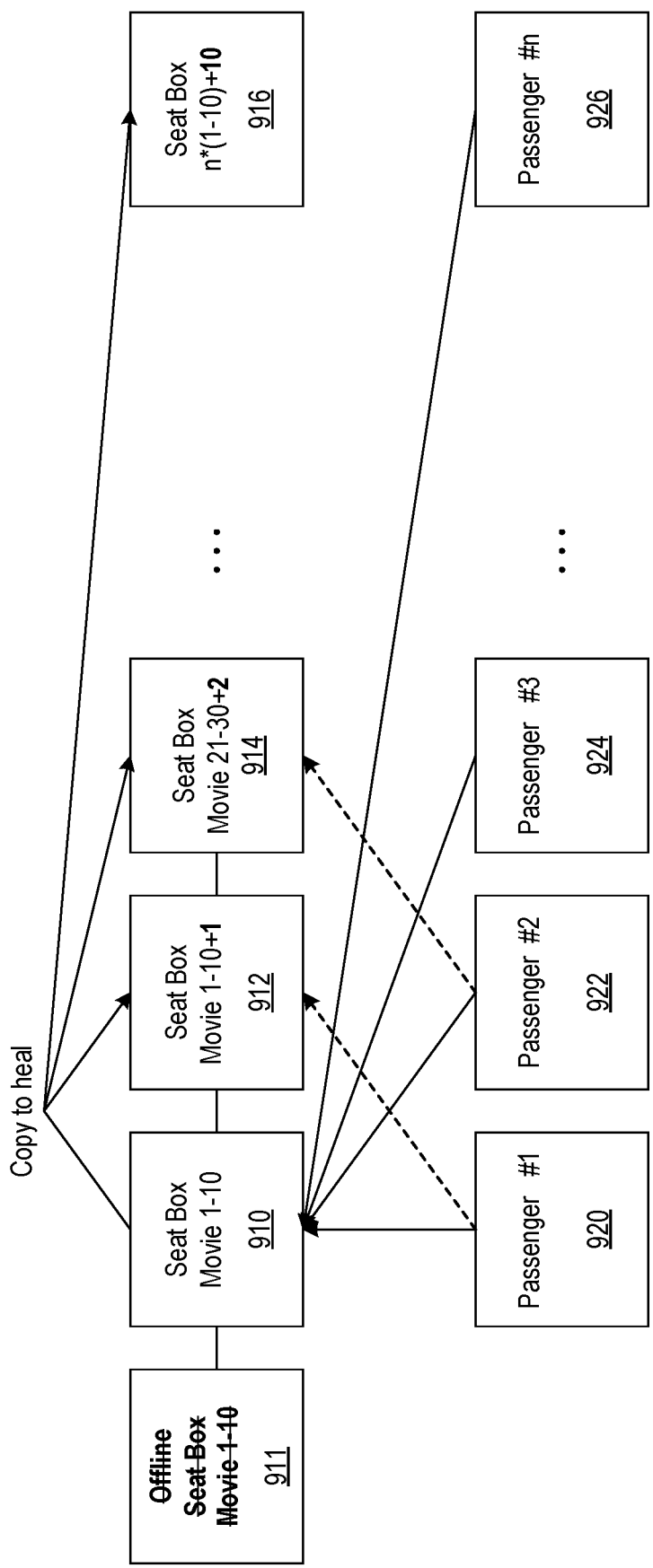
FIG. 9A shows a comparison example of a conventional node healing operation and FIG. 9B shows an example of a healing operation using a data storage system based on some implementations of the disclosed technology.
Figure 9B:
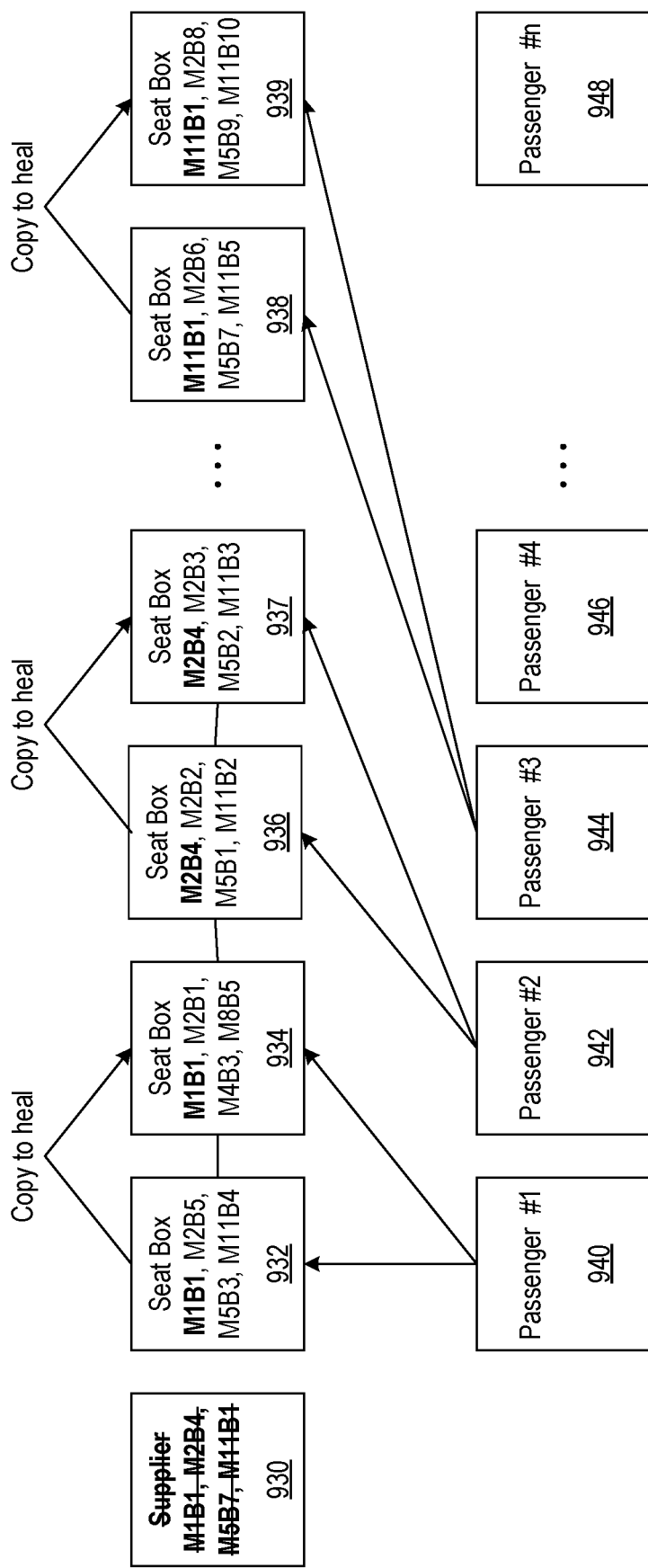

FIG. 9A shows a comparison example of a conventional node healing operation and FIG. 9B shows an example of a healing operation using a data storage system based on some implementations of the disclosed technology.

In the comparison example as shown in FIG. 9A, the seat boxes 910 and 911 store Movies 1 to 10 and the seat box 911 becomes offline due to unexpected errors. In this case, the healing operation proceeds such that Movies 1 to 10, which are stored in the seat box 911, are copied to the remaining seat boxes 912, 914, 916. Since the seat box 911 is offline, Movies 1 to 10 are copied from the seat box 910 to the remaining seat boxes 912, 914, 916. In FIG. 9A, Movie 1 is copied from the seat box 910 to the seat box 912, Movie 2 is copied from the seat box 910 to the seat box 914, and so on. Due to the healing operation, the seat box 910 begins to experience high load due to the shifted streamlining demand in addition to the task of copying all of Movies 1 to 10 to the remaining seat boxes 912, 914, 916 according to the healing operation. In addition, the conventional healing operation has disadvantages in that each seat box reserves spaces for at least one movie, e.g., 20 GB, to deal with this healing operation, which results in one to two terabytes (TBs) of idle space in typical aircraft. Furthermore, the healing operation happens in a sequential manner and thus one to two hours are needed in the conventional healing process.

FIG. 9B shows an example of the healing operation using a data storage system based on some implementations of the disclosed technology. In the implementations of the disclosed technology, data is stored in each seat box in the unit of blocks instead of the whole file and each seat box includes blocks of different files of movies. When the seat box 930 storing blocks M1B1, M2B4, M5B7, and M11B1 becomes offline due to unexpected errors, the healing operation proceeds. The healing operation corresponds to a mechanism to account for a seat box that is no longer responsive or is incapable of serving the local content it has stored to the remaining seat boxes of the storage cluster. The blocks that were stored on the failed seat box are identified by the monitor nodes of the data storage system and those blocks are replicated to still-active seat boxes. In the example of FIG. 9B, when the seat box 930 storing blocks M1B1, M2B4, M5B7, and M11B1 is offline, the block M1B1 is copied from the seat box 932 to the seat box 934, the block M2B4 is copied from the seat box 936 to the seat box 937, and the block M11B1 is copied from the seat box 938 to the seat box 939. Although now shown in FIG. 9B, the block M5B7 is copied from one seat box to another seat box. The healing operation copying different blocks, M1B1, M2B4, M5B7, and M11B1 can proceed in parallel.

In the implementations of the disclosed technology, what is copied by a seat box during the healing operation is the block instead of the whole file, and thus the amount of data copied from the seat box is far less as compared to that of the conventional healing operation as shown in FIG. 9A in which 10 movie files, Movies 1 to 10, are copied from the seat box 910. With the great reduction of the amount of data copied during the healing operation, the space in each seat box that is reserved for the preparation of the healing operation can be reduced too, which leaves more storage space available for other operations. Also, since the healing operation copying different blocks of the different movies is performed in parallel at different seat boxes, it is possible to reduce the time for the healing operation. In the implementations, the failure of the seat box 930 is detected by the monitor nodes and the healing operation is performed by the monitor nodes in real time. In some implementations, the failure of the monitoring nodes is also detected, and the impact of the failure of the monitoring nodes is minimized due to the voting mechanism. After the healing operation, the blocks are redistributed among the seat boxes and the storage map is updated by the monitor nodes. For example, after the healing operation, the request for block M1B1 can be redirected to the seat box 934, the request for block M2B4 can be redirected to the seat box 937, and the request for block M11B1 can be redirected to the seat box 939. Although now shown in FIG. 9B, the request for the block M5B7 can be redirected accordingly. After the healing operation, the monitor nodes provide the updated storage map to the host of the data storage system. The host of the data storage system may direct the requests from the clients based on the updated storage map. In the example, the data management algorithm helps the host of the data storage system to automatically redirect the requests from the clients.

Figure 10A:
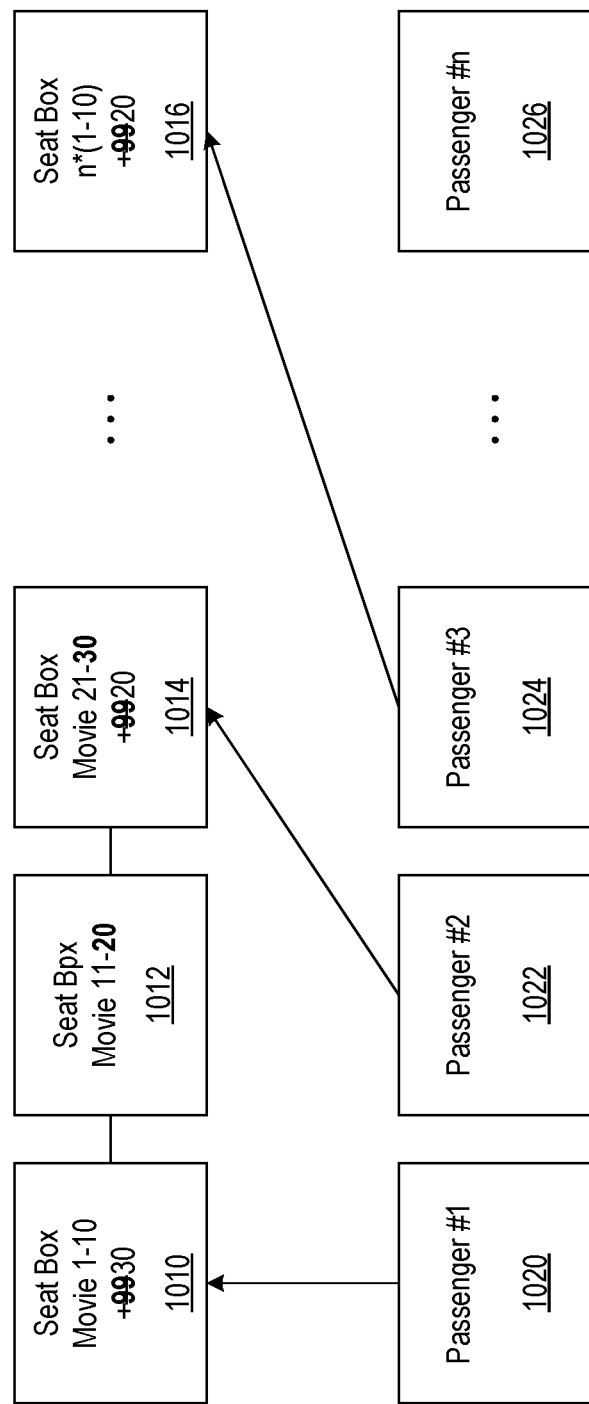
FIG. 10A shows a comparison example of a conventional promoting or demoting operation and FIG. 10B shows an example of a promoting or demoting operation using a data storage system based on some implementations of the disclosed technology.
Figure 10B:
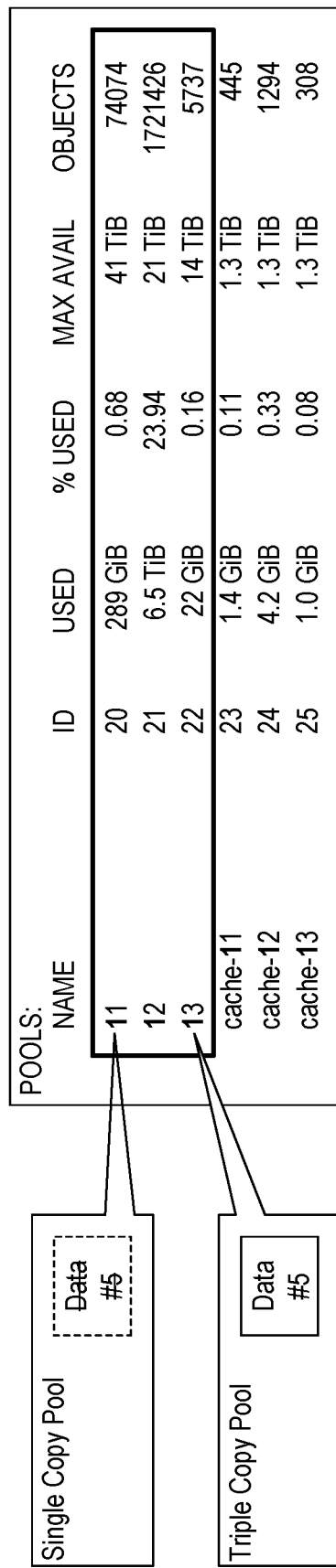

FIG. 10A shows a comparison example of a conventional promoting or demoting operation and FIG. 10B shows an example of a promoting or demoting operation using a data storage system based on some implementations of the disclosed technology.

In the comparison example as shown in FIG. 10A, as more requests for the files of Movie 20 and Movie 30 are received from the passengers, the files of Movie 20 and Movie 30 are promoted by making extra copies of the files of Movies 20 and Movie 30. In the example of FIG. 10A, two copies of the file of Movie 20 are made to the seat boxes 1014 and 1016 and one copy of the file of Movie 30 is made to the seat box 1010. The number of copies may be based on the number of requests for the files. In the promoting operation, it needs to be determined which files are deleted to provide storages for making copies of the files of Movie 20 and Movie 30. In FIG. 10A, the copies of Movies 20 and Movie 30 are made by deleting the file of Movie 99, which is stored in the seat boxes 1010, 1014 and 1016. Thus, the file of Movie 99 is demoted by being deleted from the seat boxes. The promoting operation can be understood as enhancing accessibility of a corresponding data, and the demoting operation can be understood as the opposite of the promoting operation. The conventional promoting and demoting operations could only be performed on the ground since the file-based storage map is not maintained in a passenger vehicle and instead is maintained by a ground server or by others on the ground. In addition, the conventional promoting and demoting operations are performed manually by an engineer on the ground, which requires human intervention to manage the storage map. Furthermore, the conventional promoting and demoting operations could make the data distribution more unbalanced if quantities are not equal or an integer multiple exists, and the conventional promoting and demoting operations require a great deal of optimization to leverage multi-casting.

In the implementations of the disclosed technology, the promoting and demoting of a block can be done much more simply by using the data storage system of the disclosed technology. The data storage system of the disclosed technology maintains multiple pools including a single copy pool, a double copy pool, and a triple copy pool, depending on the number of copies of the data (e.g., block) existing in the data storage system. The number of copy pools is not limited to three and can vary. In addition, the number of copies is scalable and can be any number while the conventional mechanism allows only a limited number of copies such as one or any even number. In the suggested implementations of the data storage system, the promoting and demoting operations are performed by moving data between pools. In the example of FIG. 10B, the data storage system implemented to create the storage cluster allows movement of data #5 (e.g., block) from the single copy pool to the triple copy pool. The redundant copies are automatically removed, and the new copies of the blocks are distributed automatically to be statistically even. Since the promoting and demoting operations are performed in the unit of blocks, the copying/removing of the blocks can proceed in parallel. The quantity being promoted and the quantity being demoted are independent from each other.

Figure 11:
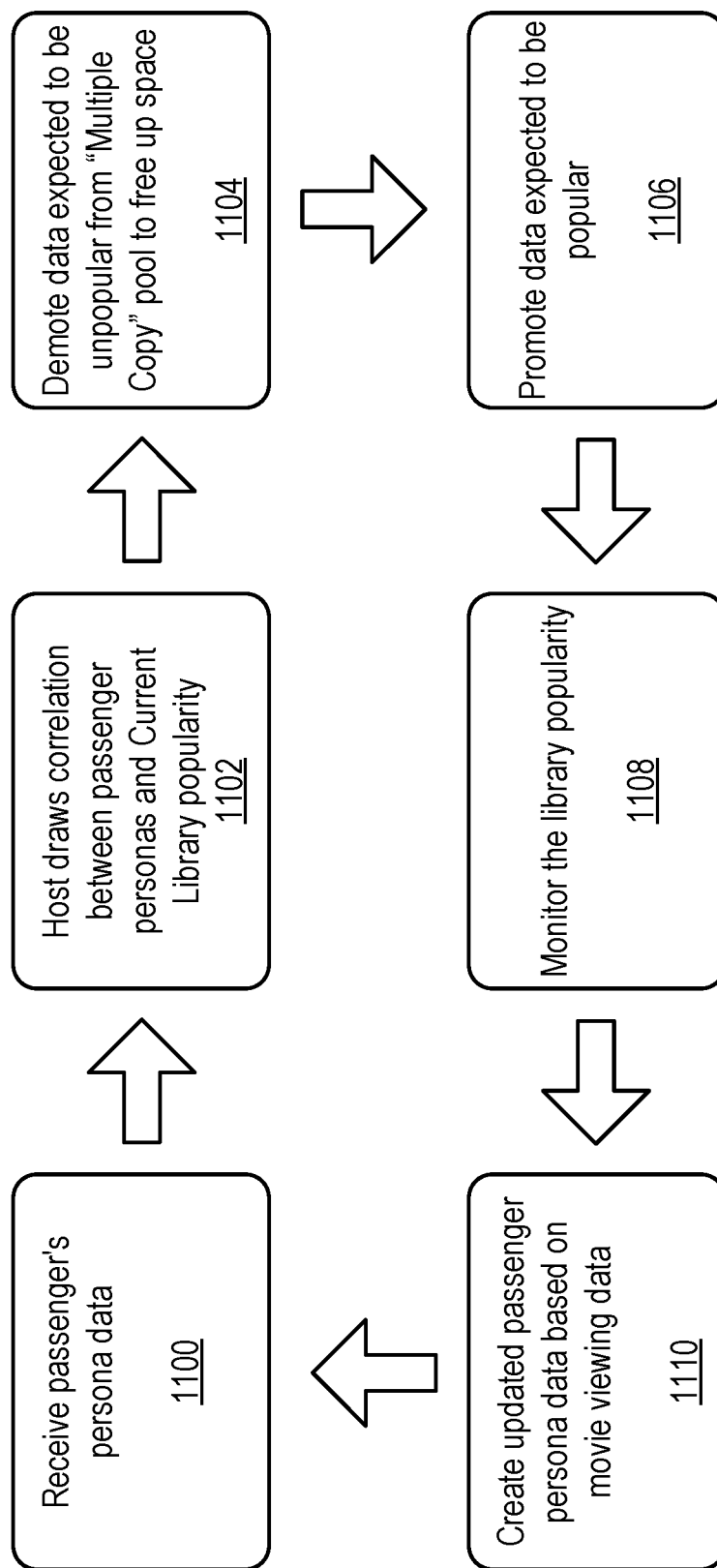
FIG. 11 shows a diagram illustrating how to determine data to be promoted or demoted based on some implementations of the disclosed technology.

FIG. 11 shows a diagram illustrating how to determine data to be promoted or demoted based on some implementations of the disclosed technology. In the operation 1100, passenger information is received. For a first cycle of operations, the passenger information can be obtained from the database of the IFE system. As discussed above in relation to FIG. 1, the IFE system may include the database storing the passenger information which includes names and ages of passengers, preferred entertainment options (movies, music, shows, etc.), preferred entertainment content (e.g., genres of movies), etc. In the operation 1102, the host of the data storage system obtains a correlation between the passenger personal information and the current library popularity, which indicates popularity of entertainment content existing in the data storage system. Based on the correlation, the host of the data storage system performs the promoting and demoting of data In the operation 1104, blocks of the movie which are expected to be unpopular according to the correlation are demoted from the multiple-copy pool to free up space. In the operation 1106, blocks of movies which are expected to be more popular according to the correlation are promoted. In the operation 1108, the library popularity is monitored by the host of the data storage system. In the operation 1110, the passenger personal information is updated based on the movie viewing history of the passengers. The updated passenger personal information is provided to the IFE system and a second cycle of operations proceeds by repeating the operations 1100 to 1110 using the updated passenger personal information.

Figure 12:
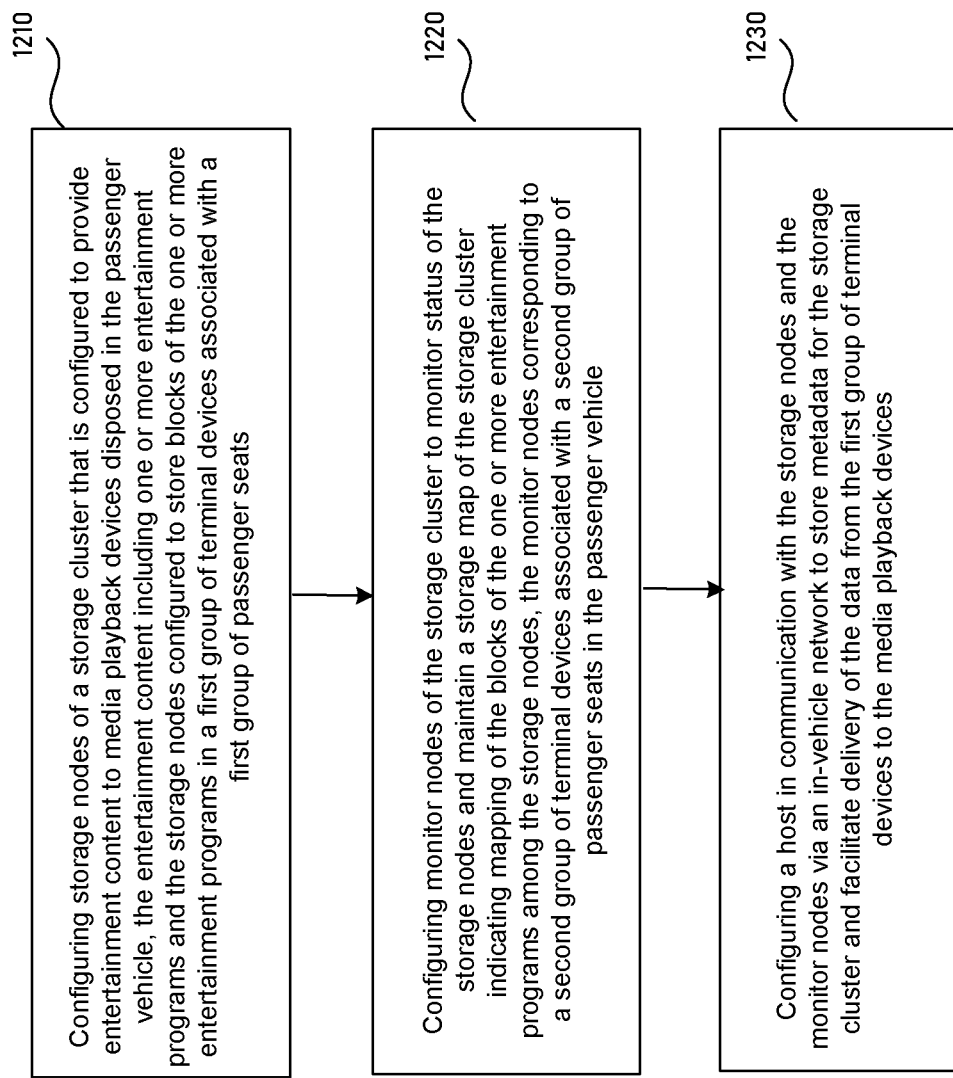
FIG. 12 is an example flowchart of a method for providing a data storage system for passengers in a passenger vehicle.

FIG. 12 is an example flowchart of a method for providing a data storage system for passengers in a passenger vehicle. The method includes, at operation 1210, configuring storage nodes of a storage cluster that is configured to provide entertainment content to media playback devices disposed in the passenger vehicle. The entertainment content includes one or more entertainment programs and the storage nodes are configured to store blocks of the one or more entertainment programs in a first group of terminal devices associated with a first group of passenger seats. The method further includes, at operation 1220, configuring monitor nodes of the storage cluster to monitor status of the storage nodes and maintain a storage map of the storage cluster indicating mapping of the blocks of the one or more entertainment programs among the storage nodes, the monitor nodes corresponding to a second group of terminal devices associated with a second group of passenger seats in the passenger vehicle. The method further includes at operation 1230, configuring a host in communication with the storage nodes and the monitor nodes via an in-vehicle network to store metadata for the storage cluster and facilitate delivery of the data from the first group of terminal devices to the media playback devices. The configuring of the host may further include: receiving a first request for a particular entertainment program from a first passenger device and a second request for the particular entertainment program from a second passenger device; and directing the first request to a first terminal device operating as a first storage node storing a first block of the particular entertainment program and the second request to a second terminal device operating as a second storage node storing a second block of the particular entertainment program.

Figure 13:
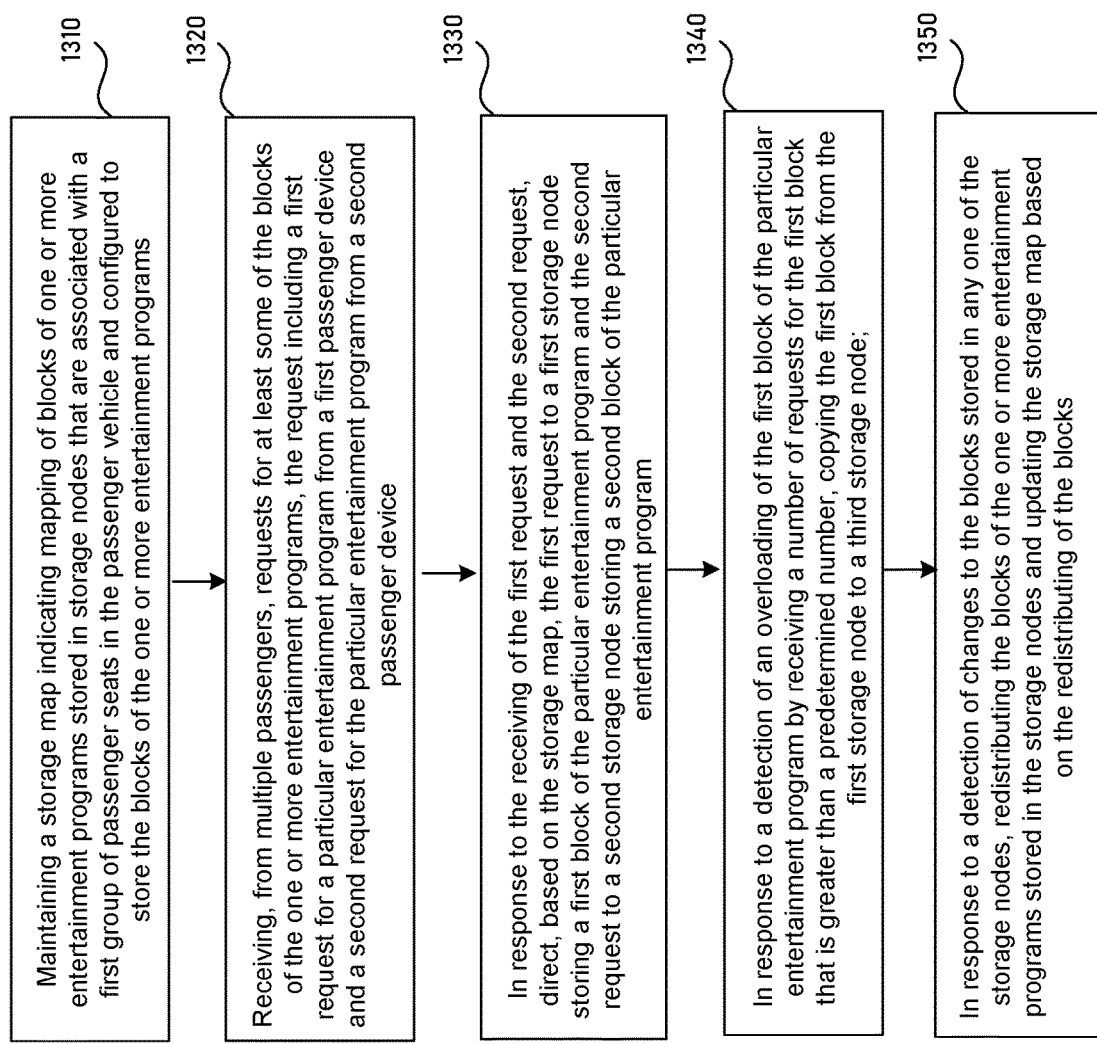
FIG. 13 is an example flowchart of a method for providing entertainment content from a data storage system to passengers in a passenger vehicle.

FIG. 13 is an example flowchart of a method for providing entertainment content from a data storage system to passengers in a passenger vehicle. The method implemented by an in-vehicle entertainment system including the data storage system. The method includes, at operation 1310, maintaining a storage map indicating mapping of blocks of one or more entertainment programs stored in storage nodes that are associated with a first group of passenger seats in the passenger vehicle and configured to store the blocks of the one or more entertainment programs. The method further includes, at operation 1320, receiving, from multiple passengers, requests for at least some of the blocks of the one or more entertainment programs, the request including a first request for a particular entertainment program from a first passenger device and a second request for the particular entertainment program from a second passenger device. The method further includes, at operation 1330, in response to the receiving of the first request and the second request, direct, based on the storage map, the first request to a first storage node storing a first block of the particular entertainment program and the second request to a second storage node storing a second block of the particular entertainment program. The method further includes, at operation 1340, in response to a detection of an overloading of the first block of the particular entertainment program by receiving a number of requests for the first block that is greater than a predetermined number, copying the first block from the first storage node to a third storage node. The method further includes, at operation 1350, in response to a detection of changes to the blocks stored in any one of the storage nodes, redistributing the blocks of the one or more entertainment programs stored in the storage nodes and updating the storage map based on the redistributing of the blocks.

The various implementations of the data storage system provide the following benefits in addition to the benefits as discussed earlier. Since the data storage system of the disclosed technology creates the storage cluster located in the passenger seats, there is no need for a separate head end server which is required in the conventional data storage/distribution for the IFE system. In the implementations, even if the head end server is provided in the IFE system, the head end server and the data storage system are independent from each other since the suggested data storage system operates autonomously. Thus, according to the implementations of the disclosed technology, the cabin pool size of the data storage system no longer needs to match the storage size of the head end server. For example, the head end server has a data size of 40 TB and the cabin file system has a data size of 20 TB. In some implementations, the head end server and the cabin file system can work together by cooperating with each other, as the head end server as well as the cabin file system have 20 TB data storage capacity for storing different data without the need to store two duplicated copies of the same data corresponding to 20 TB. The head end server and the cabin file system can be upgraded independently from each other and making changes to the cabin file system does not require the same storage change on the headend server, which allows more cost-effective data management for the customer. In addition, as discussed below, no file mapping is required on the ground and the promoting and demoting of the data can be performed on board without requiring human interventions. Thus, the support from the ground can be replaced with the automated and independent data management in which all data block locations are calculated and distributed by the data management algorithm to be statistically even regardless of the number of nodes.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Various techniques preferably incorporated within some embodiments may be described using the following clause-based format.

1. A data storage system for providing entertainment content to terminal devices in a passenger vehicle, comprising: a first group of terminal devices associated with a first group of passenger seats in the passenger vehicle and configured to operate as storage nodes of a storage cluster configured to provide the entertainment content to media playback devices disposed in the passenger vehicle, the entertainment content including one or more entertainment programs and the storage nodes configured to store blocks of the one or more entertainment programs; a second group of terminal devices associated with a second group of passenger seats in the passenger vehicle and configured to operate as monitor nodes in the storage cluster, the monitor nodes configured to monitor status of the storage nodes; and a host in communication with the first group of the terminal devices and the second group of the terminal devices via an in-vehicle network and configured to store metadata for the storage cluster and facilitate delivery of the entertainment content from the first group of terminal devices to the media playback devices, and wherein the host is configured to (1) receive a first request for a particular entertainment program from a first passenger device and a second request for the particular entertainment program from a second passenger device and (2) direct the first request to a first terminal device operating as a first storage node storing a first block of the particular entertainment program and the second request to a second terminal device operating as a second storage node storing a second block of the particular entertainment program.

In some implementations, each of the first passenger device and the second passenger device may correspond to a seatback display, a remote controller in an armrest of a passenger seat or other locations, or a passenger's personal entertainment device (PED) such as cellular phones, smart phones, tablet computers, laptop computers, and other portable electronic devices, or other devices. In some implementations, the particular entertainment program corresponds to a movie, a song or an audio program, a television show, or others, and the particular entertainment program is divided into multiple blocks including the first block and the second block, each block corresponding to a predetermined time interval of the particular entertainment program. For example, in some implementations, a movie (typically between 120 to 150 minutes of run-time) may be divided into 15 blocks, each representing approximately 10 minutes of play time. Depending on the airplane configuration, e.g., number of passenger seats and the total amount of storage capacity available onboard the airplane, block sizes of between 2 to 20 minutes may be used.

In some implementations, the first block and the second block of the particular entertainment program may correspond to a same portion of the particular entertainment program. For example, if the first passenger device makes the first request to start playing of the particular entertainment program, the host directs the first request to the first terminal device storing the first block corresponding to the first five minutes of the particular entertainment program. Then, if the second passenger device makes the second request to start playing of the particular entertainment program before the first passenger device finishes the playback of the first five minutes of the particular entertainment program, the host directs the second request to the second terminal device storing the second block corresponding to the first five minutes of the particular entertainment program. In this case, the requests from the passenger devices for the same portion of the particular entertainment program may be directed to different terminal devices that have the requested block stored in their local storage. Such a spreading of requests and the terminal device that fulfils the request advantageously results in spreading out bandwidth load in the in-flight entertainment network.

In some implementations, the first block and the second block of the particular entertainment program may correspond to different portions of the particular entertainment program. For example, if the first passenger device makes the first request to start playing of the particular entertainment program, the host directs the first request to the first terminal device storing the first block corresponding to the first five minutes of the particular entertainment program. Then, if the second passenger device makes the second request corresponding to another five-minute segment of the particular entertainment program, the host may direct the second request to the second terminal device storing the second block corresponding to the another five minutes of the particular entertainment program. In this case, the data storage system can still achieve a balanced load by directing the passenger requests for the same particular entertainment program to different terminal devices.

2. The data storage system of clause 1, wherein the in-vehicle network comprises cabling that provides symmetric bandwidth for data transmission to and from the first group of the terminal devices and the host is configured to implement a data management algorithm to distribute the blocks of the one or more entertainment programs among the storage nodes based on the symmetric bandwidth provided for the data transmission.

3. The data storage system of clause 1, wherein the particular entertainment program is divided into multiple blocks that include the first block and the second block, and the multiple blocks of the particular entertainment program are stored in multiple storage nodes including the first storage node and the second storage node.

4. The data storage system of clause 1, wherein the first group of storage devices includes a first storage device and a second storage device that have different storage sizes from each other.

5. The data storage system of clause 1, wherein, in response to a detection of an overloading of a particular block of the particular entertainment program by receiving a number of requests for the particular block that is greater than a predetermined number, the particular block is copied from a third storage node currently storing the particular block to a fourth storage node.

6. The data storage system of clause 1, wherein a monitor node is configured to detect a failure of the storage nodes and perform, in response to a detection of the failure of a particular storage node, a healing operation to copy blocks stored in the particular storage node to other storage nodes than the particular storage node.

7. The data storage system of clause 1, wherein a monitor node is configured to maintain a storage map of the storage nodes, update the storage map in response to any change to the blocks stored in the storage nodes, and provide an updated storage map to the host.

8. The data storage system of clause 1, wherein the data storage system is configured to maintain a single copy pool of blocks, each block in the single copy pool having a single copy, a double copy pool of blocks, each block in the double copy pool having two copies, and a triple copy pool of blocks, each block in the triple copy pool having three copies.

9. The data storage system of clause 8, wherein at least one of the first block and the second block of the particular entertainment program is moved among the single copy pool, the double copy pool, and the third copy pool based on at least one of a popularity of the particular entertainment program or passenger information of the passengers in the passenger vehicle.

10. A method for providing a data storage system for passengers in a passenger vehicle (e.g., method 1200 depicted in FIG. 12), comprising: configuring storage nodes of a storage cluster that is configured to provide entertainment content to media playback devices disposed in the passenger vehicle, the entertainment content including one or more entertainment programs and the storage nodes configured to store blocks of the one or more entertainment programs in a first group of terminal devices associated with a first group of passenger seats; configuring monitor nodes of the storage cluster to monitor status of the storage nodes and maintain a storage map of the storage cluster indicating mapping of the blocks of the one or more entertainment programs among the storage nodes, the monitor nodes corresponding to a second group of terminal devices associated with a second group of passenger seats in the passenger vehicle; and configuring a host in communication with the storage nodes and the monitor nodes via an in-vehicle network to store metadata for the storage cluster and facilitate delivery of the data from the first group of terminal devices to the media playback devices, and wherein the configuring of the host further includes: receiving a first request for a particular entertainment program from a first passenger device and a second request for the particular entertainment program from a second passenger device; and directing the first request to a first terminal device operating as a first storage node storing a first block of the particular entertainment program and the second request to a second terminal device operating as a second storage node storing a second block of the particular entertainment program.

11. The method of clause 10, further comprising: applying a data management algorithm to the data storage system to distribute the blocks of the one or more entertainment programs among the storage nodes based on a symmetric bandwidth of the in-vehicle network that is provided for data transmission to and from the first group of the terminal devices.

12. The method of clause 10, wherein the particular entertainment program is divided into multiple blocks that include the first block and the second block, and the multiple blocks of the particular entertainment program are stored in multiple storage nodes including the first storage node and the second storage node.

13. The method of clause 10, wherein a monitor node is configured to detect a failure of the storage nodes and perform, in response to a detection of the failure of a particular storage node, a healing operation to copy blocks stored in the particular storage node to other storage nodes than the particular storage node.

14. The method of clause 10, wherein a monitor node is configured to maintain a storage map of the storage nodes, update the storage map in response to any change to blocks stored in the storage nodes, and provide an updated storage map to the host.

15. The method of clause 14, further comprising: applying a data management algorithm to the data storage system to redistribute the blocks of the one or more particular entertainment programs among the storage nodes in response to the any change to the blocks stored in the storage nodes.

16. A method for providing entertainment content from a data storage system to passengers in a passenger vehicle (e.g., method 1300 depicted in FIG. 13), the method implemented by an in-vehicle entertainment system including the data storage system and comprising: maintaining a storage map indicating mapping of blocks of one or more entertainment programs stored in storage nodes that are associated with a first group of passenger seats in the passenger vehicle and configured to store the blocks of the one or more entertainment programs; receiving, from multiple passengers, requests for at least some of the blocks of the one or more entertainment programs, the request including a first request for a particular entertainment program from a first passenger device and a second request for the particular entertainment program from a second passenger device; in response to the receiving of the first request and the second request, direct, based on the storage map, the first request to a first storage node storing a first block of the particular entertainment program and the second request to a second storage node storing a second block of the particular entertainment program; in response to a detection of an overloading of the first block of the particular entertainment program by receiving a number of requests for the first block that is greater than a predetermined number, copying the first block from the first storage node to a third storage node; and in response to a detection of changes to the blocks stored in any one of the storage nodes, redistributing the blocks of the one or more entertainment programs stored in the storage nodes and updating the storage map based on the redistributing of the blocks.

17. The method of clause 16, wherein the second storage node is configured to further store a third block of the particular entertainment program, and wherein the method further comprises: in response to a detection of a failure of the second storage node, copying the second block from a third storage node storing the second block to a fourth storage node and copying the third block from a fifth storage node storing the third block to a sixth storage node.

18. The method of clause 16, further comprising: receiving passenger personal information including at least one of profiles of passengers, preferred entertainment options, or preferred entertainment content; monitoring entertainment content viewing history of the passengers during a trip; and updating the passenger personal information based on a result of the monitoring; and promoting or demoting a particular block of the particular entertainment program based on an updated passenger personal information.

19. The method of clause 16, wherein the storage map is maintained by monitor nodes associated with a second group of passenger seats in the passenger vehicle and configured to monitor status of the storage nodes.

20. The method of clause 16, further comprising: receiving a third request for the particular entertainment program from a third passenger device; and in response to the receiving of the third request, direct, based on an updated storage map, the third request to a fourth storage node storing a corresponding block to the third request.

In some embodiments, the host and the monitor node may further maintain and use a combination of physical layout of the data network among the various passenger seats and storage networks and an actual bandwidth availability in the in-vehicle network. For example, in some embodiments, the in-vehicle network wiring may be organized in multiple columns of seats, each having a single wire drop from the server, and all seats within a column sharing a same transmission medium (e.g., daisy-chained ethernet cabling). Here, the column may represent all seats in an aircraft row or all seats in a particular cabin class (e.g., economy, business, etc.). In such a case, the total bandwidth available at a particular requesting passenger device may depend on bandwidth being used by other passenger devices in the same column, but relatively independent of bandwidth utilization by passenger devices in a different column. Accordingly, in some embodiments, when the host receives a request for entertainment program from a passenger device, the request may be directed to a target storage node further based on bandwidth utilization by other devices belonging to the same column as the target storage node. To facilitate this decision, the host or the monitor node may maintain a column-by-column map of bandwidth being utilized at any given time, based on activity at all terminal devices in each column.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A data storage system for providing entertainment content to terminal devices in a passenger vehicle, comprising:

a first group of terminal devices associated with a first group of passenger seats in the passenger vehicle and configured to operate as storage nodes of a storage cluster configured to provide the entertainment content to media playback devices disposed in the passenger vehicle, the entertainment content including one or more entertainment programs and the storage nodes configured to store blocks of the one or more entertainment programs;

a second group of terminal devices associated with a second group of passenger seats in the passenger vehicle and configured to operate as monitor nodes in the storage cluster, the monitor nodes configured to monitor status of the storage nodes; and a host in communication with the first group of the terminal devices and the second group of the terminal devices via an in-vehicle network and configured to store metadata for the storage cluster and facilitate delivery of the entertainment content from the first group of terminal devices to the media playback devices, and wherein the host is configured to (1) receive a first request for a particular entertainment program from a first passenger device and a second request for the particular entertainment program from a second passenger device and (2) direct the first request to a first terminal device operating as a first storage node storing a first block of the particular entertainment program and the second request to a second terminal device operating as a second storage node storing a second block of the particular entertainment program.

2. The data storage system of claim 1, wherein the in-vehicle network comprises cabling that provides symmetric bandwidth for data transmission to and from the first group of the terminal devices and the host is configured to implement a data management algorithm to distribute the blocks of the one or more entertainment programs among the storage nodes based on the symmetric bandwidth provided for the data transmission.

3. The data storage system of claim 1, wherein the particular entertainment program is divided into multiple blocks that include the first block and the second block, and the multiple blocks of the particular entertainment program are stored in multiple storage nodes including the first storage node and the second storage node.

4. The data storage system of claim 1, wherein the first group of terminal devices includes a first terminal device and a second terminal device that have different storage sizes from each other.

5. The data storage system of claim 1, wherein, in response to a detection of an overloading of a particular block of the particular entertainment program by receiving a number of requests for the particular block that is greater than a predetermined number, the particular block is copied from a third storage node currently storing the particular block to a fourth storage node.

6. The data storage system of claim 1, wherein a monitor node is configured to detect a failure of the storage nodes and perform, in response to a detection of the failure of a particular storage node, a healing operation to copy blocks stored in the particular storage node to other storage nodes than the particular storage node.

7. The data storage system of claim 1, wherein a monitor node is configured to maintain a storage map of the storage nodes, update the storage map in response to any change to the blocks stored in the storage nodes, and provide an updated storage map to the host.

8. The data storage system of claim 1, wherein the data storage system is configured to maintain a single copy pool of blocks, each block in the single copy pool having a single copy, a double copy pool of blocks, each block in the double copy pool having two copies, and a triple copy pool of blocks, each block in the triple copy pool having three copies.

9. The data storage system of claim 8, wherein at least one of the first block and the second block of the particular entertainment program is moved among the single copy pool, the double copy pool, and the third copy pool based on at least one of a popularity of the particular entertainment program or passenger information of the passengers in the passenger vehicle.

10. A method for providing a data storage system for passengers in a passenger vehicle, comprising:
configuring storage nodes of a storage cluster that is configured to provide entertainment content to media playback devices disposed in the passenger vehicle, the entertainment content including one or more entertainment programs and the storage nodes configured to store blocks of the one or more entertainment programs in a first group of terminal devices associated with a first group of passenger seats;
configuring monitor nodes of the storage cluster to monitor status of the storage nodes and maintain a storage map of the storage cluster indicating mapping of the blocks of the one or more entertainment programs among the storage nodes, the monitor nodes corresponding to a second group of terminal devices associated with a second group of passenger seats in the passenger vehicle; and
configuring a host in communication with the storage nodes and the monitor nodes via an in-vehicle network to store metadata for the storage cluster and facilitate delivery of the data from the first group of terminal devices to the media playback devices, and
wherein the configuring of the host further includes:
receiving a first request for a particular entertainment program from a first passenger device and a second request for the particular entertainment program from a second passenger device; and
directing the first request to a first terminal device operating as a first storage node storing a first block of the particular entertainment program and the second request to a second terminal device operating as a second storage node storing a second block of the particular entertainment program.

11. The method of claim 10, further comprising: applying a data management algorithm to the data storage system to distribute the blocks of the one or more entertainment programs among the storage nodes based on a symmetric bandwidth of the in-vehicle network that is provided for data transmission to and from the first group of the terminal devices.

12. The method of claim 10, wherein the particular entertainment program is divided into multiple blocks that include the first block and the second block, and the multiple blocks of the particular entertainment program are stored in multiple storage nodes including the first storage node and the second storage node.

13. The method of claim 10, wherein a monitor node is configured to detect a failure of the storage nodes and perform, in response to a detection of the failure of a particular storage node, a healing operation to copy blocks stored in the particular storage node to other storage nodes than the particular storage node.

14. The method of claim 10, wherein a monitor node is configured to maintain a storage map of the storage nodes, update the storage map in response to any change to blocks stored in the storage nodes, and provide an updated storage map to the host.

15. The method of claim 14, further comprising: applying a data management algorithm to the data storage system to redistribute the blocks of the one or more particular entertainment programs among the storage nodes in response to the any change to the blocks stored in the storage nodes.

16. A method for providing entertainment content from a data storage system to passengers in a passenger vehicle, the method implemented by an in-vehicle entertainment system including the data storage system and comprising:
maintaining a storage map indicating mapping of blocks of one or more entertainment programs stored in storage nodes that are associated with a first group of passenger seats in the passenger vehicle and configured to store the blocks of the one or more entertainment programs;
receiving, from multiple passengers, requests for at least some of the blocks of the one or more entertainment programs, the request including a first request for a particular entertainment program from a first passenger device and a second request for the particular entertainment program from a second passenger device;
in response to the receiving of the first request and the second request, direct, based on the storage map, the first request to a first storage node storing a first block of the particular entertainment program and the second request to a second storage node storing a second block of the particular entertainment program;
in response to a detection of an overloading of the first block of the particular entertainment program by receiving a number of requests for the first block that is greater than a predetermined number, copying the first block from the first storage node to a third storage node; and
in response to a detection of changes to the blocks stored in any one of the storage nodes, redistributing the blocks of the one or more entertainment programs stored in the storage nodes and updating the storage map based on the redistributing of the blocks.

17. The method of claim 16, wherein the second storage node is configured to further store a third block of the particular entertainment program, and
wherein the method further comprises: in response to a detection of a failure of the second storage node, copying the second block from a third storage node storing the second block to a fourth storage node and copying the third block from a fifth storage node storing the third block to a sixth storage node.

18. The method of claim 16, further comprising:
receiving passenger personal information including at least one of profiles of passengers, preferred entertainment options, or preferred entertainment content;
monitoring entertainment content viewing history of the passengers during a trip;
updating the passenger personal information based on a result of the monitoring; and
promoting or demoting a particular block of the particular entertainment program based on an updated passenger personal information.

19. The method of claim 16, wherein the storage map is maintained by monitor nodes associated with a second group of passenger seats in the passenger vehicle and configured to monitor status of the storage nodes.

20. The method of claim 16, further comprising:
receiving a third request for the particular entertainment program from a third passenger device; and
in response to the receiving of the third request, direct, based on an updated storage map, the third request to a fourth storage node storing a corresponding block to the third request.

\* \* \* \* \*